(12) United States Patent
Moriuchi et al.

(10) Patent No.: US 7,016,053 B2
(45) Date of Patent: Mar. 21, 2006

(54) IMAGE PROCESSING TYPE OF MEASURING DEVICE, LIGHTING SYSTEM FOR THE SAME, LIGHTING SYSTEM CONTROL METHOD, LIGHTING SYSTEM CONTROL PROGRAM, AND A RECORDING MEDIUM WITH THE LIGHTING SYSTEM CONTROL PROGRAM RECORDED THEREIN

(75) Inventors: Eisuke Moriuchi, Kawasaki (JP); Seiji Shimokawa, Kawasaki (JP); Keiji Akagi, Kawasaki (JP)

(73) Assignee: Mitutoyo Corporation, Kawasaki (JP)

( * ) Notice: Subject to any disclaimer, the term of this patent is extended or adjusted under 35 U.S.C. 154(b) by 315 days.

(21) Appl. No.: 10/383,647

(22) Filed: Mar. 10, 2003

(65) Prior Publication Data

US 2003/0169431 A1    Sep. 11, 2003

(30) Foreign Application Priority Data

Mar. 11, 2002   (JP) ............................. 2002-065997

(51) Int. Cl.
*G01B 11/24* (2006.01)
*F21N 33/00* (2006.01)

(52) U.S. Cl. ...................... 356/601; 356/309; 356/317; 362/237; 362/249

(58) Field of Classification Search ............... 356/601, 356/309, 317–318; 250/205, 238; 362/237, 362/249, 245, 241, 247, 800
See application file for complete search history.

(56) References Cited

U.S. PATENT DOCUMENTS

| | | | | |
|---|---|---|---|---|
| 5,038,258 A | * | 8/1991 | Koch et al. | 362/237 |
| 5,690,417 A | | 11/1997 | Polidor et al. | |
| 5,844,680 A | * | 12/1998 | Sperling | 356/303 |
| 6,614,596 B1 | * | 9/2003 | Gladnick | 359/630 |
| 6,630,801 B1 | * | 10/2003 | Schuurmans | 315/307 |
| 6,689,999 B1 | * | 2/2004 | Haines et al. | 250/205 |
| 6,857,762 B1 | * | 2/2005 | Shimokawa et al. | 362/245 |
| 2002/0181231 A1 | * | 12/2002 | Luk | 362/240 |

FOREIGN PATENT DOCUMENTS

| | | |
|---|---|---|
| JP | A 2001-153808 | 6/2001 |
| JP | A 2002-100486 | 4/2002 |

* cited by examiner

*Primary Examiner*—Gregory J. Toatley, Jr.
*Assistant Examiner*—Sang H. Nguyen
(74) *Attorney, Agent, or Firm*—Oliff & Berridge, PLC

(57) ABSTRACT

Luminous intensity and chromaticity of each luminescent light source are measured for an impressed current value, a mixing ratio of intensities of lights emitted from luminescent light sources required for synthesizing lighting intensity with the preset chromaticity at the luminous intensity instructed by an instruction value is computed with a theoretical equation for computing changes in chromaticity correlating to changes in luminous intensities of the luminescent light sources for color synthesis (ST33), luminous intensities of each luminous light source for generating a luminous intensity instructed by an instruction value from a mixing ratio are computed (ST34), and the impressed current value required for making each luminous light source emit light at the luminous intensity is read out from the characteristics of luminous light sources (ST35).

4 Claims, 27 Drawing Sheets

| LUMINOUS INTENSITY OF LIGHT WITH EACH COLOR | | RED CURRENT VALUE(mA) | GREEN CURRENT VALUE(mA) | BLUE CURRENT VALUE(mA) |
|---|---|---|---|---|
| BRIGHT ↕ DARK | W100 | 180 | 355 | |
| | W90 | 160 | 332 | |
| | W80 | 143 | 305 | |
| | W70 | 125 | 270 | |
| | | | | |
| | W20 | 35 | 52 | 360 |
| | W10 | 20 | 30 | 180 |

| LUMINOUS INTENSITY OF SYNTHESIZED WHITE LIGHT | | RED | | GREEN | | BLUE | |
|---|---|---|---|---|---|---|---|
| | | LUMINOUS INTENSITY (lx) | CURRENT VALUE (mA) | LUMINOUS INTENSITY (lx) | CURRENT VALUE (mA) | LUMINOUS INTENSITY (lx) | CURRENT VALUE (mA) |
| BRIGHT ↕ DARK | W100 | 50 | 92 | 100 | 355 | 20 | 360 |
| | W90 | 45 | 85 | 90 | 332 | 18 | 326 |
| | W80 | 40 | 71 | 80 | 305 | 16 | 295 |
| | W70 | 35 | 59 | 70 | 270 | 14 | 250 |
| | | | | | | | |
| | W20 | 10 | 20 | 20 | 52 | 4 | 90 |
| | W10 | 5 | 12 | 10 | 30 | 2 | 50 |

33R     33G     33B

| LUMINOUS INTENSITY (lx) | | LIGHTING SYSTEM A CURRENT VALUE(mA) | LIGHTING SYSTEM B CURRENT VALUE(mA) | LIGHTING SYSTEM C CURRENT VALUE(mA) |
|---|---|---|---|---|
| BRIGHT ↑ ↓ DARK | 100 | 350 | 355 | 360 |
| | 90 | 340 | 330 | 335 |
| | 80 | 310 | 300 | 295 |
| | 70 | 260 | 270 | 250 |
| | | | | |
| | 20 | 86 | 80 | 90 |
| | 10 | 25 | 25 | 50 |

FIG.9

CHANGE OF CHROMATICITY COORDINATE VALUES (MEASURED VALUES)

| LUMINOUS INTENSITY | x | y |
|---|---|---|
| W100 | 0.3306 | 0.2928 |
| W90 | 0.3306 | 0.2909 |
| W80 | 0.3317 | 0.2927 |
| W70 | 0.3321 | 0.2940 |
| W60 | 0.3375 | 0.2967 |
| W50 | 0.3338 | 0.2947 |
| W40 | 0.3369 | 0.2979 |
| W30 | 0.3372 | 0.3015 |
| W20 | 0.3498 | 0.2943 |
| W10 | 0.3401 | 0.2943 |

LIGHT INTENSITY RANK

| LIGHT INTENSITY RANK | LIGHT INTENSITY(mcd) | | |
|---|---|---|---|
| | MINIMUM | STANDARD | MAXIMUM |
| RANK A | 12000 | 14000 | 17000 |
| RANK B | 8400 | 10000 | 12000 |
| RANK C | 6000 | 7000 | 8400 |

CHROMATICITY RANK

| CHROMATICITY RANK | CHROMATICITY COORDINATE VALUES | |
|---|---|---|
| | x | y |
| RANK F | 0.09 | 0.60 |
| | 0.09 | 0.72 |
| | 0.17 | 0.72 |
| | 0.17 | 0.60 |
| RANK G | 0.14 | 0.64 |
| | 0.14 | 0.74 |
| | 0.22 | 0.74 |
| | 0.22 | 0.64 |

FIG. 15

INSTRUCTION VALUE/CURRENT VALUE TABLE

| INSTRUCTION VALUE[%] | LUMINOUS INTENSITY OF SYNTHESIZED COLOR[lx] | CURRENT VALUE | | |
|---|---|---|---|---|
| | | RED | GREEN | BLUE |
| 1 | 0.48 | 570 | 692 | 766 |
| 2 | 0.8 | 593 | 775 | 903 |
| 3 | 1.12 | 650 | 830 | 985 |
| ... | ... | ... | ... | ... |
| 100 | 160 | 11705 | 29863 | 50643 |

LIGHTING CURB FOR CONTROL

| INSTRUCTION VALUE[%] | LUMINOUS INTENSITY OF SYNTHESIZED COLOR[lx] |
|---|---|
| 1 | 0.48 |
| 2 | 0.8 |
| 3 | 1.12 |
| ⋮ | ⋮ |
| 100 | 160 |

FIG. 19

CURRENT, LUMINOUS INTENSITY, AND CHROMATICITY CORRELATIVE CHARACTERISTICS TABLE

| CURRENT INSTRUCTION VALUE | RED | | | GREEN | | | BLUE | | |
|---|---|---|---|---|---|---|---|---|---|
| | LUMINOUS INTENSITY [lx] | x | Y | LUMINOUS INTENSITY [lx] | x | Y | LUMINOUS INTENSITY [lx] | x | Y |
| 0 | 0.00 | 0.6895 | 0.3044 | 0.00 | 0.1986 | 0.7578 | 0.00 | 0.135 | 0.0852 |
| 128 | 0.21 | 0.6965 | 0.3033 | 0.93 | 0.1988 | 0.7564 | 0.65 | 0.1354 | 0.0771 |
| 256 | 1.05 | 0.6964 | 0.3034 | 5.91 | 0.1977 | 0.7548 | 2.16 | 0.1358 | 0.0728 |
| ... | | | | | | | | | |
| 65536 | 241.3 | 0.6961 | 0.3036 | 167.1 | 0.1955 | 0.7483 | 42.5 | 0.1365 | 0.0667 |
| AVERAGE CHROMATICITY | | 0.6949 | 0.3036 | | 0.1977 | 0.7543 | | 0.1357 | 0.0754 |

IMAGE PROCESSING TYPE OF MEASURING DEVICE, LIGHTING SYSTEM FOR THE SAME, LIGHTING SYSTEM CONTROL METHOD, LIGHTING SYSTEM CONTROL PROGRAM, AND A RECORDING MEDIUM WITH THE LIGHTING SYSTEM CONTROL PROGRAM RECORDED THEREIN

BACKGROUND OF THE INVENTION

1. Field of the Invention

The present invention relates to an image processing type of measuring device used for measuring the size or form of an object to be measured from an image of the measured object obtained with an optical system, a lighting system or the measuring device, a method of controlling the lighting system, a control program for the lighting system, and a recording medium with the lighting system control program recorded therein. More specifically the present invention relates to a lighting system or lighting control for an image processing type of measuring device capable of stabilizing luminous intensity or chromaticity of light irradiated to an object to be measured.

2. Description of the Related Art

There has been used an image processing type of measuring device capable of optically magnifying a measured portion of an object to be measured with a magnifying optical system and measuring the size or form of the objected to be measured from the magnified image. The image processing type of measuring device as described above includes, for instance, a microscope, a projector, and a three-dimensional image measuring device. In the image processing type of measuring device, lighting to an object to be measured plays an extremely important role for obtaining an image of the measured object.

As a lighting system for the image processing type of measuring device as described above, there have been known, in addition to the vertical incident-light system in which light is irradiated from a point substantially just above an object to be measured to the measured object, the diagonal incident-light system in which light is irradiated to an object to be measured from a point positioned in a direction inclined at a prespecified angle against an optical axis of the image pick-up optical system, the translucent lighting system in which light for illumination is irradiated from a point substantially just below an object to be measured to the measured object.

Recently a LED (Light Emitting Diode) is used as a luminescent light source for the lighting systems as described above. In the LEDs, generally the light intensity and chromaticity largely vary due to such factors as errors generated during the production process at the manufacture. To overcome this problem, LEDs are ranked to several types according to the light intensity and chromaticity for sale on the market (See FIG. 11).

The purchasers are required, however, to specify the ranks of the LEDs before purchase, which causes increase of the cost, and even if a purchaser buys LEDs specifying the rank before purchase, there still remains the variance of product quality within the rank, which may quite negatively affect the image processing type of measuring device. For instance, if light intensity varies from a piece of LED to another piece of LED, reliable compatibility of the part program among image processing type of measuring devices is lost.

Further, when red, green, and blue lights emitted from the respective LEDs are mixed and the synthesized light is irradiated to an object to be measured, if luminous intensity of the synthesized light is changed, sometimes the same chromaticity can not be reproduced.

When it is required to control light intensity of an LED, generally intensity of the emitted light, namely luminous intensity of lighting is controlled by changing an impressed current (forward current) through the LED chip. However, as the light intensity characteristics of each LED is non-linear against changes of the current (See FIG. 12), for instance, when current values for LEDs emitting lights with different colors respectively are changed at an equal pitch, a percentage of each color in the synthesized light varies, so that the specific chromaticity of the synthesized light can not be reproduced stably. This change in the chromaticity is magnified by aberration of the optical element, which in turn degrades the accuracy in measurement.

To describe in further detail, the image processing type of measuring device comprises, for instance, a lighting system for irradiating light to an object to be measured, a light-receiving sensor for receiving the reflected light from the measured object, and an image processor for obtaining a form of the measured object from an image received by the light-receiving sensor. The lighting system comprises, for instance, a plurality of luminescent light sources (LEDs) capable of emitting lights with different colors respectively, an impressed current control section for controlling an impressed current to each of the luminescent light sources for light emission, and an instruction value input device which can be operated from the outside for setting therein the luminous intensity of lighting as an instruction value.

The chromaticity coordinates (x, y) for light emission is previously specified for each LED as a luminescent light source for light with a specific color, and therefore for synthesizing light with a specified synthesized color, for instance, white color light with the CIE 1931 chromaticity coordinates (0.3, 0.3), the mixing ratio of lights emitted from the LEDs for element colors ($r_R$, $r_G$, $r_B$) is computed. Then the intensity of light emitted from each LED corresponding to the luminous intensity L instructed by the instruction value input device is decided as shown below respectively. In the following equations, $L_R$ indicates the luminous intensity of the LED emitting light with red, $L_G$ indicates the luminous intensity of the LED emitting, light with green, and $L_B$ indicates the luminous intensity of the LED emitting light with blue.

$$L_R = r_R L$$

$$L_G = r_G L$$

$$L_B = r_B L$$

Then values for impressed currents required to make the LEDs emit lights according to the specified luminous intensities of $L_R$, $L_G$, and $L_B$ respectively are computed. The impressed current control section impresses currents to the LEDs according to the instruction values.

In the configuration as described above, a user instructs the luminous intensity L for lighting with the instruction value input device. Then the impressed current control section allows impression of the specified impressed currents to the luminescent light sources so that synthesized light having a specified chromaticity such as, for instance, a white color will be synthesized and irradiated according to the instructed luminous intensity. When the specified currents are impressed to the LEDs, the luminescent light sources for light emission emit lights according to the specified luminous intensities ($L_R$, $L_G$, $L_B$), and white light is irradiated to an object to be measured according to the instructed luminous intensity. The reflected light from the measured object is received by the light-receiving sensor, and such parameters as the form or size of the measured objected are measured by, for instance, detecting edges of the measured object from the received image.

In measurement of an image, the luminous intensity and chromaticity of light irradiated to an object to be measured is very important For instance, when the actual luminous intensity for lighting is lower as compared to the specified one, the amount of light is insufficient and an image can not be obtained, or edge detection can not be performed. When the actual luminous intensity for lighting is higher as compared to the specified one, the light is saturated, so that the image is blur (or partially lacked) and edge detection can not be performed also in this case.

Further, when chromaticity of lighting includes aberration caused by the white light, as an image of a colored objected to be measured can not be picked up accurately, edge detection can not be performed also in this case. Namely, control of impressed currents to a red LED, a green LED, and a blue LED to accurately control the luminous intensity and chromaticity for synthesized lighting is extremely important for precise measurement.

As each LED has the individual difference (variance), also the luminous intensity of each discrete diode disadvantageously varies even if the current having the same rated value is impressed thereto. FIG. 26A, FIG. 26B and FIG. 27 show the relations between impressed current values and the luminous intensities when a red LED, a green LED, and a blue LED are made to emit lights with respective colors in each lighting system. For instance, in the luminous intensity characteristics of the red LED shown in FIG. 26A, when an impressed current becomes larger, also the luminous intensity becomes higher in all devices, but as understood from the comparison between the device 1 and the device 4, a difference in the luminous intensity substantially varies in a device to which a current with a higher value is impressed. This is true also for the green LED shown in FIG. 26B and the blue LED shown in FIG. 27. Namely an impressed current value required to make each LED emit light at a specified luminous intensity value from an LED to an LED, so that, even if the luminous intensity is instructed, a value of an impressed current from for each discrete LED can not easily be decided.

When a current is impressed according to an instructed value for the impressed current, the luminous intensity of each LED may be off from the desired value, which may in turn result in intensity of synthesized light off from the instructed value. If luminous intensity of each LED is off from the instructed one, then also the chromaticity of the synthesized light is disadvantageously off from the desired one.

Further the chromaticity of light emitted from each LED includes the individual difference, and in addition the chromaticity changes in correlation to a change in intensity of the emitted light. FIG. 28, FIG. 29A, FIG. 29B, FIG. 30A, and FIG. 30B show the correlations between the luminous intensity and the chromaticity when a red LED, a green LED, and a blue LED are made to emit light respectively.

For instance, the x coordinate for the chromaticity of a blue LED in each lighting system is shown in FIG. 30A. This figure shows how a chromaticity coordinates changes in response to changes in luminous intensity. Further this figure shows that the chromaticity is different in each lighting system. It is understood from FIG. 28, FIG. 29A, and FIG. 29B that the same is true for a red LED and a green LED.

In other words, as the chromaticity of light emitted from each LED is different, if a mixing ratio of each light for generating synthesizing light is fixed according to a characteristic, the chromaticity of synthesized light is disadvantageously different from the instructed one.

When the intensity of light emitted from each LED is adjusted, taking into considerations the difference of luminous intensity characteristics of each discrete LED, for changing a value of the current impressed to the LED to achieve the desired luminous intensity with synthesized light, it is possible to achieve the accurate luminous intensity. In this case, however, if the luminous intensity is changed, also the chromaticity changes, and therefore there occurs the problem that the chromaticity of synthesized light is off from the desired value.

On the contrary, even if a color mixing ratio of lights emitted from the LEDs is decided by paying attention to the chromaticity for realizing the desired chromaticity for lighting with synthesized light, the chromaticity of light emitted from of each diode is different, and further the chromaticity of emitted light changes in correlation to the luminous intensity, so that the chromaticity of a LED can not be decided unitarily and a mixing ratio for achieving the desired chromaticity can not simply be decided.

SUMMARY OF THE INVENTION

One of the objects of the present invention is to provide a lighting system for an image processing type of measuring device capable of overcoming the above-described problems in the conventional technology and realizing stable lighting in terms of such parameters as luminous intensity and chromaticity.

The present invention provides a lighting system for an image processing type of measuring device having an optical system for lighting including a luminescent light source and irradiating light from this optical system for lighting to an object to be measured to measure the size, form or other parameters of the measured object from an obtained image of the measured object, the lighting system comprising a storage unit for storing data concerning a relation between the luminous intensity obtained with the optical system for lighting and a current flown to the luminescent light source, and a control unit for controlling a impressed current flown to the luminescent light sources so that the luminous intensity obtained with the optical system for lighting satisfies a preset value.

With this configuration, as data concerning the relation between the luminous intensity obtained with the optical system for lighting and a current flown to the luminescent light source is stored in the storage unit, the luminous intensity obtained with the optical system, namely the luminous intensity of light irradiated to an object to be measured can be controlled so that the preset value is satisfied by controlling the current flown to the luminescent light source based on the data concerning the relation between the luminous intensity and the current value stored in this storage unit. Therefore negative influence by variance in intensity of light emitted from the luminescent light source can be suppressed and lighting can be performed with stable luminous intensity, and further compatibility of a part program between image processing types of measuring devices is insured.

In the lighting system according to the present invention, the luminescent light source for the optical system for lighting comprises LEDs, and a plurality of instructions for the relation between the luminous intensity obtained with the optical system for lighting and a impressed current flown to each of the LEDs should preferably be stored in the storage unit as different references for luminous intensity.

With the configuration, in addition to the basic effects provided by the present invention as described above, lighting can be realized with stable luminous intensity, even if LEDs in lower ranks sold by manufacturers in the market are purchased.

In the lighting system according to the present invention, a luminescent light source of said optical system for lighting comprises LEDs emitting light with red, green, and blue colors respectively, and a plurality of data sets concerning the relations between the luminous intensity obtained with the optical system for lighting when an LED is lit and a impressed current flown to the LED preferably are set for each LED as references for different luminous intensities.

With this configuration, LEDs emitting lights with red, green, and blue colors respectively are provided as luminescent light sources for the optical system for lighting, so that a color of the light irradiated to an object to be measured can freely be changed by selecting an LED corresponding to the required color. Therefore, the lighting system can respond to versatility of objects to be measured, and can accurately record images of the objects to be measured.

Further, a plurality of data sets concerning the relations between the luminous intensity obtained with the optical system for lighting when an LED is lit and a impressed current flown to the LED are set for each LED as references for different luminous intensities, so that, even if measurement is performed by irradiating light with any color to an object to be measured, lighting can be realized with stable luminous intensity.

In the lighting system according to the present invention, said luminescent light source for the optical system for lighting comprises LEDs emitting lights with red, green, and blue colors respectively, and the storing unit preferably stores therein a plurality of data sets for flowing a current to each LED so that a mixing ratio of lights emitted from the LEDs is kept at a constant value as references for luminous intensities of synthesized light.

With this configuration, in addition to the effect described in the paragraph above, there is provided the effect that any color can be realized by synthesizing lights emitted from the LEDs each emitting light with one of the three colors (red, green, and blue).

In addition, as the storing unit stored therein a plurality of data sets for flowing a current to each LED so that a mixing ratio of intensity of lights emitted from the LEDs is kept at a constant value as references for luminous intensities of synthesized light, even if luminous intensity of light with the synthesized color is changed, the mixing ratio of lights emitted from the LEDs is kept at a constant value, so that the same chromaticity can always be obtained.

In the lighting system according to the present invention, the storing unit preferably stores therein a plurality of data sets for flowing a current to each LED so that a mixing ratio of lights emitted from the LEDs is kept at a constant value for obtaining synthesized white color from the red, green, and blue lights as references for luminous intensities of synthesized white light.

With this configuration, synthesized white light can be realized by synthesizing light with lights emitted from the LEDs each emitting light with any of the three colors, and even if luminous intensity of the synthesized white light is changed, a mixing ratio of lights emitted from the LEDs is kept at a constant value, so that synthesized white light with the same chromaticity can always be obtained.

Another object of the present invention is to provide, for solving the problems in the conventional technology as described above, a lighting system control method, a lighting system control program, a recording medium with the lighting system control program recorded therein, a lighting system, and a measuring device enabling synthesized lighting with preset luminous intensity as well as preset chromaticity.

The present invention provides a lighting system control method of controlling a lighting system comprising a plurality of luminescent light sources emitting lights with different colors respectively, an impressed current control mean for controlling impressed currents to the plurality of luminescent light sources, and an input device for inputting instruction values to instruct the luminous intensity for the purpose to generate synthesized lighting with the luminous intensity and preset chromaticity instructed by the instruction values by synthesizing lights emitted from the luminescent light sources, and the method comprises a light source characteristics measuring step of measuring the intensity and chromaticity in relation to a value of the current impressed to each of the plurality of luminescent light sources; a mixing ratio computing step of computing a mixing ratio of intensities of lights emitted from said plurality of luminescent light sources required for synthesizing synthesized lighting with the luminous intensity instructed by the instruction values and the preset chromaticity with the theoretical equation for computing a mixing ratio of intensities of the lights required for synthesizing a synthesized color with the present chromaticity from a plurality of lights each with the different chromaticity in response to changes in the chromaticity corresponding to changes in luminous intensities of the luminescent light sources measured in the light source characteristics measuring step; a luminous intensity computing step of computing the luminous intensities of the plurality of luminescent light sources for generating the luminous intensity instructed by the instructed value from the mixing ratio computed in the mixing ratio computing step; and an impressed current value read-out step of reading the impressed current values required to make the plurality of luminescent light sources emit lights with the luminous intensities computed in the luminous intensity computing step from the characteristics of the plurality of luminescent light sources obtained in the luminescent light source characteristics measuring step.

With the configuration described above, a synthesized color having the instructed chromaticity can be produced at the instructed luminous intensity by synthesizing lights with different colors respectively.

In the light source characteristics measuring step, relations between an impressed current value and luminous intensity or chromaticity is checked by changing the impressed current value for each of the luminescent light sources. Namely, as the luminescent light sources are different from each other in the quality, also the luminous intensity and chromaticity of lights emitted the luminescent light sources are different from each other even if the same current is impressed to each of the luminescent light sources. Further, even if a mixing ratio of lights having different colors respectively is kept constant, when checked strictly, sometimes changes in chromaticity may appear when the luminous intensity changes. Although these changes do not become a problem in the general measurement as which strictness is not required, an additional adjustment against the changes is needed in the measurement as which strictness is required. To satisfy this requirement, it is required to check characteristics of each discrete luminescent light source.

In the mixing ratio computing step, the characteristics of each discrete luminescent light source is taken into considerations when a mixing ratio of lights emitted from the luminescent light sources required for producing a synthesized color with the present chromaticity at the instructed luminous intensity, namely a mixing ratio of intensities of the lights emitted from the luminescent light sources is computed. When further strict accuracy is required, if the luminous intensity changes, also the chromaticity may change, and therefore the mixing ratio is computed by sequentially checking whether the preset chromaticity can be synthesized or not with the theoretical equation.

Further luminous intensity required for each of the luminescent light sources is computed from the mixing ratio computed in the step above to obtain a required impressed current value for making each of the luminescent light sources emit light at the luminous intensity. When a current is impressed to each luminescent light source according to the impressed current value, synthesized light with the present chromaticity can be produced at the instructed luminous intensity.

In the lighting system control method according to the present invention, the mixing ratio computing step preferably comprises a first temporary mixing ratio setting step for initially setting a first temporary mixing ratio based on preset percentages as the mixing ratio; a temporary luminous intensity computing step of computing each luminous intensity of each of the luminescent light source required for generating the luminous intensity instructed by the instruction value based on the first temporary mixing ratio; a chromaticity read-out step of reading the chromaticity of light emitted from each of the luminescent light sources at the luminous intensity of each of the luminescent light source computed in the temporary luminous intensity computing step from a result of measurement in the light source characteristics measuring step; a second temporary mixing ratio setting step of computing, based on the theoretical equation, a mixing ratio of intensities of lights emitted from the luminescent light sources required to generate the preset chromaticity for synthesized lighting at the chromaticity read-out in the chromaticity read-out step as a second temporary mixing ratio; a temporary mixing ratio comparing step of comparing the first temporary mixing ratio to the second temporary mixing ratio; and a temporary mixing ratio resetting step of resetting the second temporary mixing ratio as the first temporary mixing ratio anew based on a result of comparison in the temporary mixing ratio comparing step.

With the configuration described above, initially a first temporary mixing ratio is set, and luminous intensity for each of the luminescent light sources for synthesizing luminous intensity instructed according to this first temporary mixing ratio is computed. When each of the luminescent light sources is caused to emit light at this luminous intensity, although the luminous intensity of the synthesized color follows the instruction, the chromaticity does not always satisfy the preset value. To overcome this problem, chromaticity corresponding to the luminous intensity of each of the luminescent light sources is read out from the characteristics of each of the luminescent light sources. Then, with the theory for color synthesis, a second mixing ratio for synthesizing the preset chromaticity at this chromaticity is computed as a second mixing ratio. If the chromaticity is kept constant even when the luminous intensity changes, it is expected that the synthesized color can be synthesized at the preset chromaticity by following the mixing ratio obtained with this theory for color synthesis, but as also the chromaticity changes in response to change in the luminous intensity, and therefore it can be considered that the present chromaticity can not be achieved by following the second temporary mixing ratio when the second temporary mixing ratio is largely off from the first temporary mixing ratio.

To overcome this problem, when the difference between the two temporary mixing ratios is larger than the allowable limit, the second temporary mixing ratio is adjusted again to get it closer to the first temporary mixing ratio by comparing the first and second temporary ratios to each other. This computing is repeated until the difference between the two temporary mixing ratios is within the allowable range.

As described above, by repeating the computing based on the theory for color synthesis, taking into considerations of the characteristics of each luminescent light source, until a result of the computing is within the allowable range, a mixing ratio for producing a synthesized color having the preset chromaticity at the instructed luminous intensity can be computed irrespective of the non-linear change in chromaticity caused by change in the luminous intensity, and further a difference between a theoretical value obtained through the theory for color synthesis and the actual color can be adjusted to a value within the allowable range.

The lighting system control method according to the present invention comprises an average chromaticity computing step of computing an average value for the chromaticity of lights emitted from the luminescent light sources, the step performed after the light source characteristics measuring step; and a representative mixing ratio computing step of computing a mixing ratio of lights emitted from said luminescent light sources required for generating the preset chromaticity of the synthesized lighting based on the average chromaticity computed in the average chromaticity computing step and through the theoretical equation as a representative mixing ratio, and the first mixing ratio in the first temporary mixing ratio setting step is preferably the representative mixing ratio.

With the configuration described above, an average value of the chromaticity of lights emitted from the luminescent light sources is computed for each of the luminescent light sources, and a mixing ratio for producing the preset chromaticity is computed with the average value for the chromaticity and through the theory for color synthesis. Then this representative mixing ratio is initially set as the first temporary mixing ratio.

Computing based on the theory for color synthesis is repeated until the difference between the first temporary mixing ratio and the second temporary mixing ratio is within the allowable range, and it is needless to say that the first temporary mixing ratio and the second temporary mixing ratio should preferably be closer values as much as possible to each other. Therefore, rather than by using approximate intensity percentages for deciding the first temporary mixing ratio, by using the representative mixing ratio computed based on the average value for the chromaticity, the allowable value can be achieved and the computing can be finished more quickly.

The lighting system control method according to the present invention comprises a verifying step of actually verifying the impressed current value read out in the impressed current value read-out step; and a correcting step of correcting said impressed current value based on a result of verification in the verifying step. Further the verifying step comprises a verifying/measuring step for impressing an impressed current to each of the luminescent light sources according to the impressed current value read out in the impressed current value read-out step and measuring the chromaticity of synthesized lighting lit then; a verifying/comparing step of comparing the chromaticity measured in the verifying/measuring step to the target preset chromaticity; and a chromaticity correction rate storing step of storing the difference between the chromaticity measured based on a result of comparison in said verifying/comparing step and the target preset chromaticity as a chromaticity correction rate; and further the correcting section preferably comprises a step of computing the mixing ratio by displacing the target preset chromaticity according to the chromaticity correction rate when computing the mixing ratio through the theoretical equation in the mixing ratio computing step.

With the configuration described above, although there is a difference between a result of theoretical computing and the actual value, a synthesized color having the preset chromaticity can accurately be synthesized at the actually instructed luminous intensity.

A synthesized color is synthesized according to an impressed current value theoretically computed, and chromaticity of this synthesized color is actually measured. Then a difference between the targeted preset chromaticity and the actual one is computed as a chromaticity correction rate. When the theory for color synthesis is applied, by taking into considerations the chromaticity correction rate for setting a target value for computing, the difference between the theory and reality can be eliminated to match chromaticity of the actually synthesized color to the targeted preset one.

The lighting system control method according to the present invention preferably comprises an instruction value/current value table storing step of storing said impressed current value and the instruction value in a form of a table with the impressed current and said instruction value correlated to each other.

With the configuration as described above, as a table with data concerning relations between an instruction value and an impressed current value recorded therein is prepared, when luminous intensity is instructed with an instruction value, synthesized lighting with a desired color can easily be performed only by reading the impressed current value from the table. Further, even if various levels of chromaticity are required, lighting with a desired synthesized color can easily be performed by storing the relations between the various instruction values each indicating chromaticity and impressed current values correlated to each other.

In the lighting system control method according to the present invention, the luminescent light source preferably comprises LEDs (light emitting diode).

With the configuration described above, a current may be reduced for light emission, so that power consumption in the lighting system can be reduced.

Further each of the luminescent light sources comprised LEDs emitting lights with red, green, and blue colors respectively. By mixing the red, green, and blue colors, any color can be synthesized. There may additionally be provided other LEDs emitting lights with other colors such as yellow, purple, and glue green.

The lighting system control program according to the present invention is used in a computer incorporated in a lighting system having a plurality of luminescent light sources each emitting light with a different color, an impressed current control unit for generating synthesized lighting with the preset luminous intensity and chromaticity by synthesizing lights from the luminescent light sources by means of controlling an impressed current to each of the luminescent light sources, and an input device for inputting an instruction value for instructing luminous intensity of lighting, and the lighting system control program making the computer execute a light source characteristics measuring step of measuring luminous intensity and chromaticity in correlation to the impressed current value for each of the luminescent light sources; a mixing ratio computing step of computing a mixing ratio of intensities of lights emitted from the luminescent light sources required for synthesizing synthesized lighting with the preset chromaticity at the luminous intensity instructed by the instruction value through the theoretic equation for computing changes in chromaticity in response to changes in luminous intensity of each of the luminescent light sources measured in the light source characteristics measuring step and a mixing ratio of intensities of lights with different colors required for synthesizing a synthesized color at the preset chromaticity from colors each at different chromaticity; a luminous intensity computing step of computing luminous intensity of each of the luminescent light sources required for generating the luminous intensity instructed by the instruction value from the mixing ratio computed in the mixing ratio computing step; and an impressed current value read-out step of reading the impressed current value required for making each of the luminescent light sources at the luminous intensity computed in the luminous intensity computing step from the characteristics of the luminescent light sources obtained in the light source characteristics measuring step.

The recording medium according to the present invention stores therein the lighting system control program described above.

With the configuration as described above, the same operational effects as those provided by the lighting system control method according to the present invention can be achieved. Further by incorporating a computer having a CPU (Central Processing Unit) or a memory (storage device) and compiling a program to make the computer execute each of the steps described above, it is possible to easily change parameters in each step. Further it is possible to directly set a recording medium with the program recorded therein in the computer for installation, or to connect a reader for reading out information stored in the recording medium as an external application to the computer and to install the program from this reader in the computer. Further the program may be supplied through a communication line or a radio communication line such as the Internet, a LAN cable, or a telephone line for installation.

The present invention provides a lighting system comprising luminescent light sources each for emitting light with a different color, an impressed current control unit for controlling an impressed current to the luminescent light sources, and an input device for inputting an instruction value for instructing luminous intensity of lighting, the lighting system generating synthesized lighting with the preset luminous intensity and chromaticity by synthesizing lights emitted from the luminescent light sources, and in this lighting system, the impressed current control unit comprises a light source characteristics measuring device for measuring and storing data concerning luminous intensity and chromaticity in response to the impressed current value for each of the luminescent light sources; a mixing ratio computing device for computing a mixing ratio of intensities of lights emitted from the luminescent light sources required for synthesizing synthesized lighting with the preset chromaticity at the luminous intensity instructed by the instruction value through the theoretical equation for computing changes in chromaticity in response to changes in luminous intensities of the luminescent light sources measured in the light source characteristics measuring device and a mixing ratio of intensities of lights with different colors required for synthesizing a synthesized color with the preset chromaticity from a plurality of colors each with different chromaticity; a luminous intensity computing device for computing luminous intensity of each of the luminescent light sources for generating the luminous intensity instructed by the instruction value from the mixing ratio computed by the mixing ratio computing device; an impressed current reader for reading the impressed current value for making each of the luminescent light sources emit light with the luminous intensity computed by the luminous intensity computing device; and an instruction value/current value table storing unit for storing an instruction value/current value table in which the impressed current value read by the impressed current reader is correlated to the instruction value.

With the configuration as described above, the same effects as those provided by the lighting system control method according to the present invention described above can be achieved.

A measuring device according to the present invention comprises the lighting system for irradiating light to an object to be measured; a light-receiving sensor for receiving reflected light from the measured light; and an image processing unit for obtaining the form of the measured objected from the image received by the light-receiving sensor by means of image processing.

With the configuration as described above, as light with the preset chromaticity is irradiated at the instructed luminous intensity from the lighting system to an object to be measured, an accurate image of the measured object can be obtained by the light-receiving sensor. Therefore the accurate form of the measured object can be obtained by processing the image.

BRIEF DESCRIPTION OF THE DRAWINGS

FIG. 5 is a view showing a lighting control table for each discrete LED in the embodiment;

FIG. 6 is a view showing a lighting control table for synthesized color lighting in the embodiment;

FIG. 9 is a view showing a result of measurement of chromaticity coordinates values when luminous intensity is changed by using the date shown in FIG. 6;

FIG. 15 is a view showing an instruction value/current value table used in the second embodiment above;

FIG. 17A is a view showing a control curb used for setting a relation between an instruction value and luminous intensity in the second embodiment, while FIG. 17B is a view showing a table in which the instruction values are correlated to luminous intensities;

FIG. 19 is a view showing characteristics of each of the luminescent light source groups in relation to an impressed current value in the second embodiment above;

FIG. 26A is a view showing the relation between an impressed current value and luminous intensity in a group of LEDs each emitting light with red for each lighting system based on the conventional technology, while

DETAILED DESCRIPTION OF THE PREFERRED EMBODIMENTS

Preferred embodiments of the lighting system for an image processing type of measuring device according to the present invention are described in detail below with reference to the attached drawings.

Figure 1:
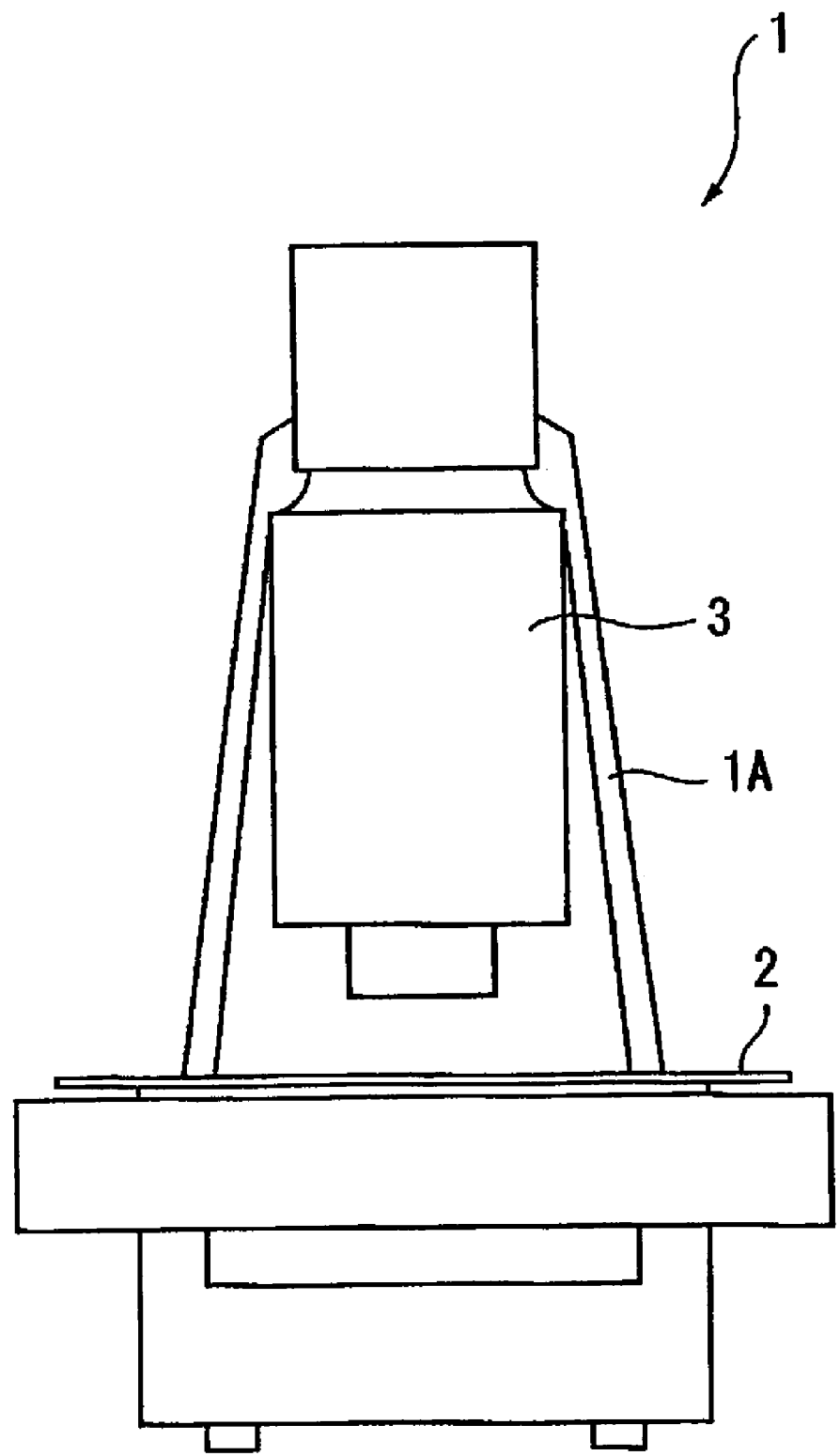
FIG. 1 is a front view showing an image processing type of measuring device according to a first embodiment of the present invention.

FIG. 1 is a front view showing an image processing type of measuring device according to a first embodiment of the present invention. This image processing type of measuring device comprises a basic body 1 of the measuring device, a stage 2 provided for placing an object to be measured thereon on the basic body 1 of the measuring device so that it can freely move forward/backward as well as in the sideward directions; and an optical system unit 3 provided on the basic body 1 of the measuring device so that it can move in the vertical direction against the stage 2, and measures the size or form of an object to be measured from an image of the measured object obtained with the optical system unit 3.

Figure 2:
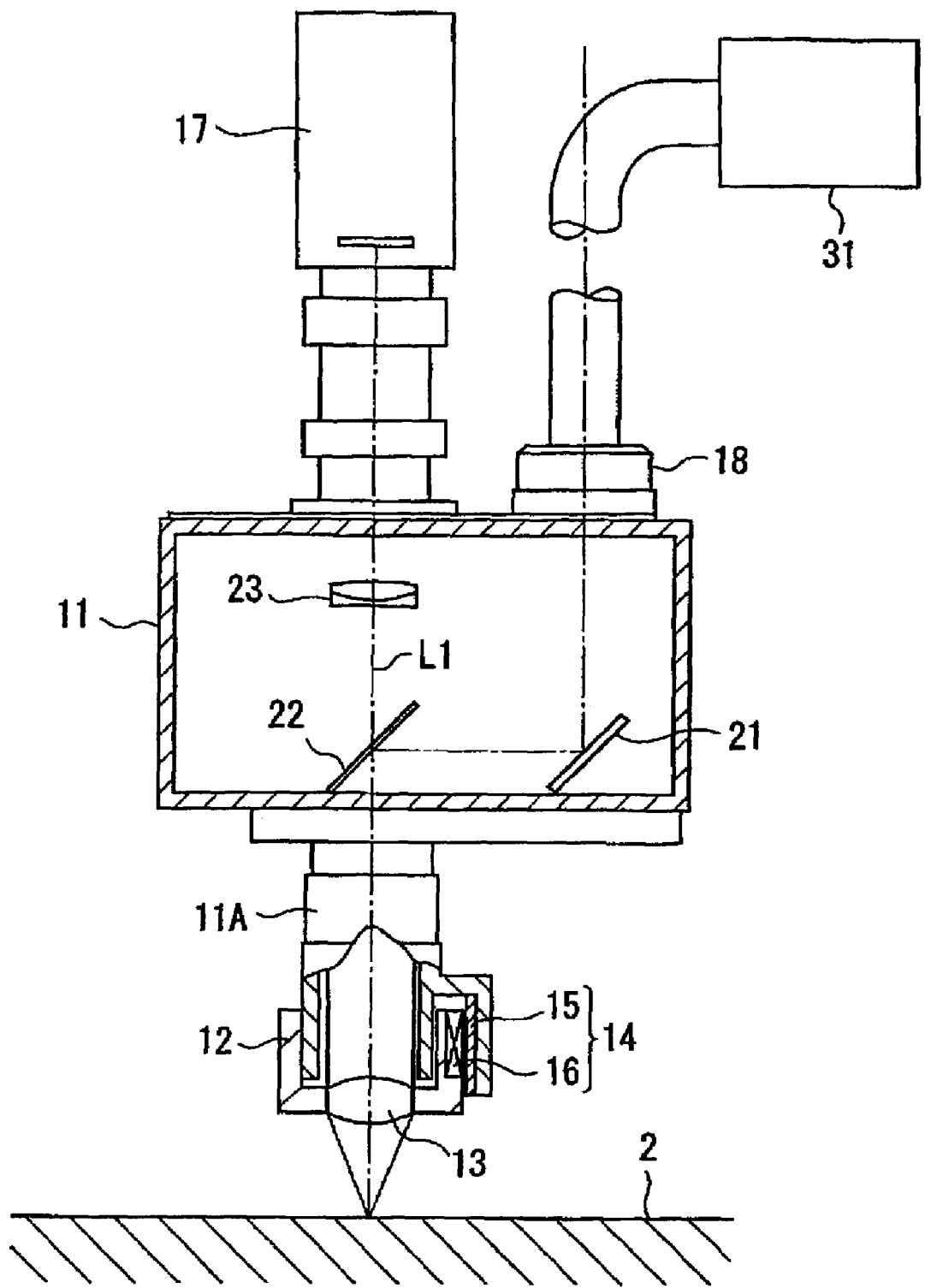
FIG. 2 is a cross-sectional view showing an optical system portion in the embodiment above.

The optical system unit 3 has a housing 11 as shown in FIG. 2. Provided in a cylindrical section 11A on the bottom surface of the housing 11 is an objective (object lens) 13 via an objective holder 12 provided displaceable in the direction along the optical axis L1 (in the vertical direction in FIG. 1). An actuator 14 as a drive mechanism for moving the objective holder 12 in the direction along the optical axis L1 is provided between the cylindrical section 11A and the objective holder 12. The actuator 14 comprises a magnet 15 fixed to the cylindrical section 11A and a coil 16 fixed to the objective holder 12.

A CCD (Charge Coupled Device) camera 17 and a light inlet tube 18 are mounted on a top surface of the housing 11 respectively. The CCD camera 17 is located on the optical axis L1 of the objective 13, and comprises an optical system for observation capable of monitoring an object to be measured based on the light irradiated from the objective 13. It should be noted that a CMOS (Complementary Metal Oxide Semiconductor) camera, a photoelectric transfer element or an image pick-up element based on other principles or on other structures may be used in place of the CCD camera 17.

Provided in the housing 11 are a mirror 21 reflecting light irradiated from an optical system for lighting 31 connected via an optical fiber or the like to the light inlet tube 18 at right angles in the direction along the optical axis L1, a beam splitter 22 reflecting the reflected light from the mirror 21 in the direction along the optical axis L1 to the objective 13, and a lens 23 provided between the beam splitter 22 and the CCD camera 17.

Figure 3:
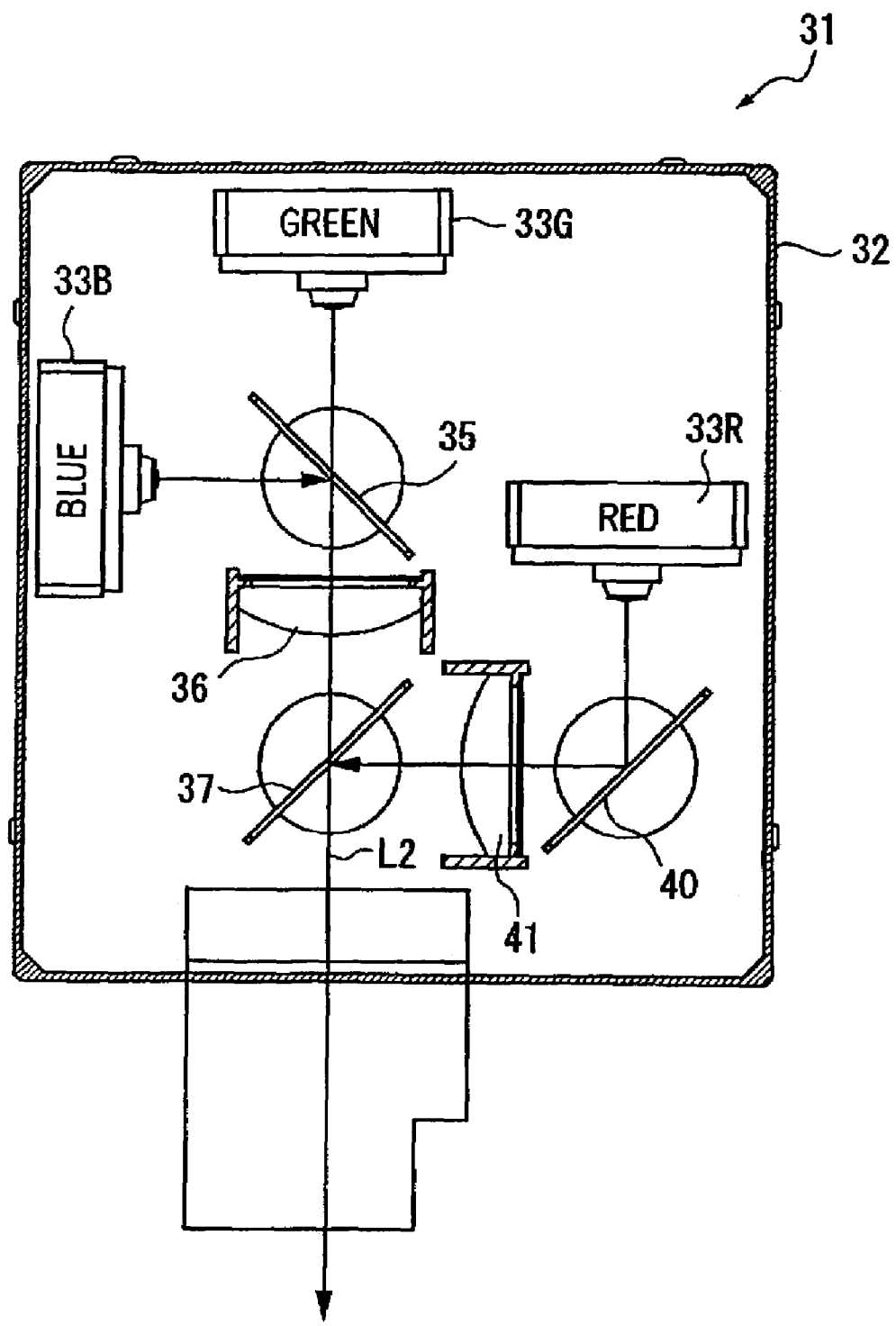
FIG. 3 is a cross-sectional view showing a lighting system according to the embodiment.

The optical system for lighting 31 comprises a housing 32 as shown in FIG. 3. Provided inside the housing 32 are LEDs 33R, 33G, 33B as luminous light sources emitting lights with red, green, and blue color respectively. The LEDs 33R, 33G, 33B each may be a discrete unit, or may be a unitized one comprising a plurality of elements. A beam splitter 35, a lens 36, and a beam splitter 37 are provided sequentially in this order on the optical axis L2 of the LED 33G. Light from the LED 33B is introduced into the beam splitter 35 from a direction normal to the optical axis L2. Light from the LED 33R is introduced into the beam splitter 37 via a mirror 40 and a lens 41 from a direction normal to the optical axis L2.

Figure 4:
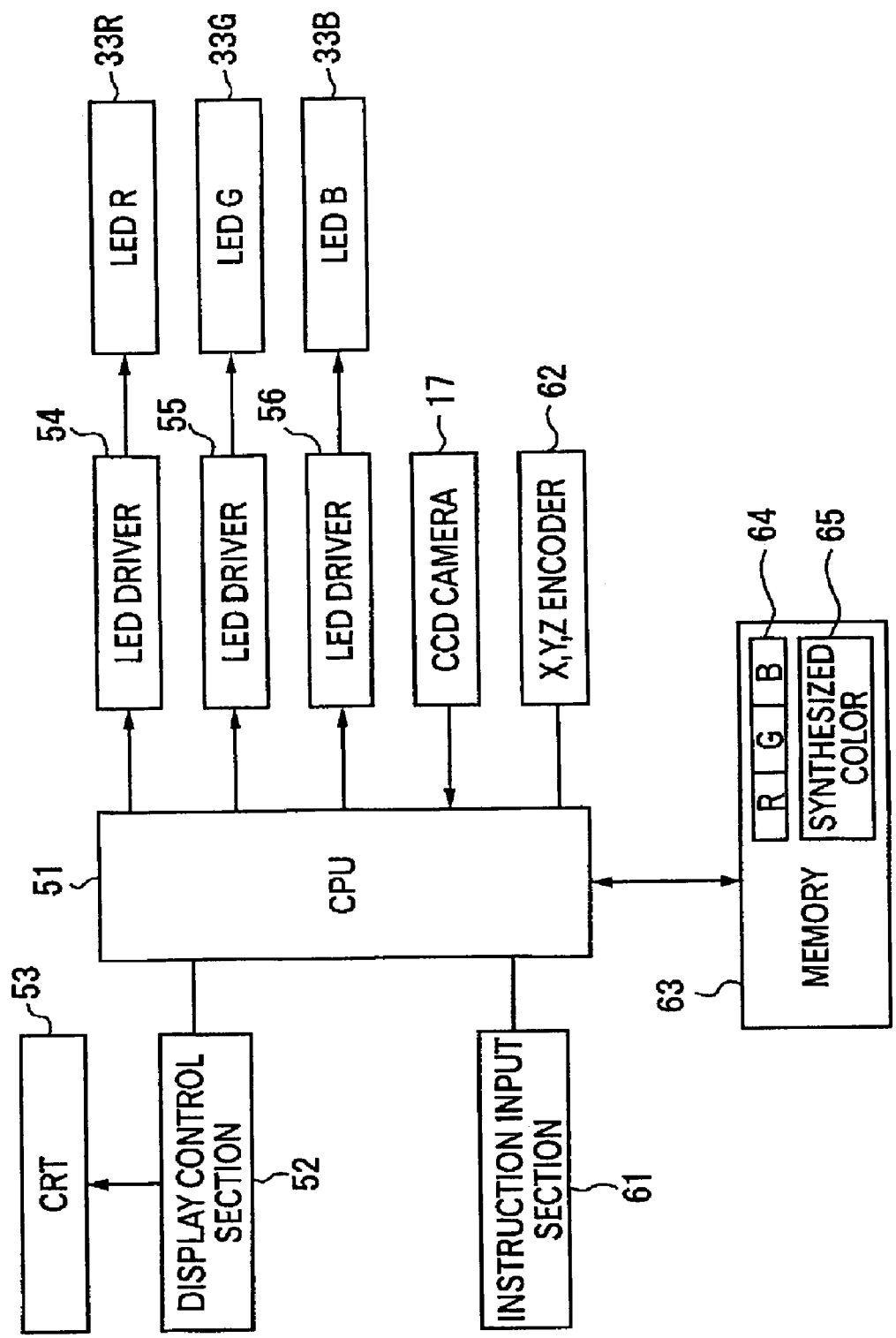
FIG. 4 is a block diagram showing the image processing type of measuring device according to the embodiment.

FIG. 4 is a block diagram showing a control unit for an image processing type of measuring device according to this embodiment of the present invention.

The control unit comprises a CPU 51 as a control unit. Connected to the CPU 51 are a CRT 53 via a display control section 52, and LEDs 33R, 33G, and 33B via LED drivers 54 to 56 respectively. Further an instruction input section 61, the CCD camera 17, X, Y, Z encoders 62 for detecting a position of the stage 2 in the X- and Y-axial directions and a position of the optical unit 3 (objective 13) in the Z-axial direction, and a memory 63 are connected to the control unit respectively.

A lighting control table 64 for each LED and a synthesized color lighting control table 65 are provided on the memory 63.

A plurality of data sets concerning the relations between the luminous intensity obtained with the optical system for lighting 31 when each of the LEDs 33R, 33G, and 33B are lit and the impressed current flown to each of the LEDs 33R, 33G and 33B are set as references for different luminous intensities (W10 to W100) in the lighting control table 64 for each LED as shown in FIG. 5.

A plurality of data sets concerning current flown to the LEDs 33R, 33G and 33B are set in a synthesized lighting control table 65, as shown in FIG. 6, so that a mixing ration of lights emitted from the LEDs 33R, 33G, and 33B is kept constant to obtain synthesized light (synthesized white light) with the red, green, and blue lights as references for different luminous intensities of the synthesized white lights (W10 to W100).

Figures 7, 8:
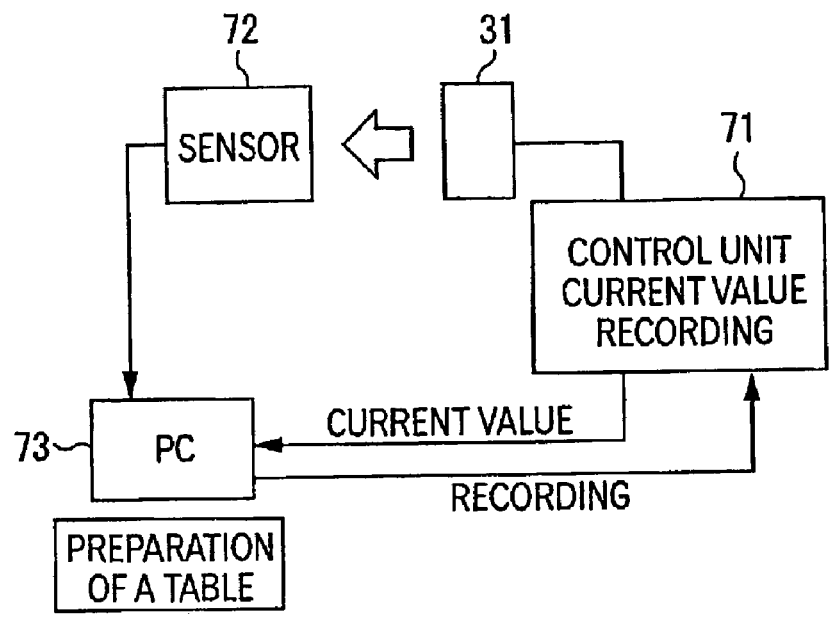
FIG. 7 is a view showing a system configuration when the lighting control table for each discrete LED and the lighting control table for synthesized color lighting are prepared.
FIG. 8 is a view showing another example of the table obtained in the system shown in FIG. 7.

The tables 64, 65 can be prepared by the method shown in FIG. 7.

A control unit 71 for controlling currents flown to luminous light sources is connected to the optical system 31 for lighting, and further a sensor 72 such as a color luminous intensity meter is located at a position for receiving light from the optical system for lighting 31, and the luminous intensity measured by the sensor 72 is fetched into a personal computer (PC) 73. The personal computer 73 fetches a value of a current (a value of the impressed current to each of the luminous light sources) from the control unit 71, and prepares a table showing relations between the luminous intensity and a current value. For instance, as shown in FIG. 8, tables for relations between luminous intensity and a current value are prepared for the lighting systems A, B, and C each having an optical system for lighting, and currents flown to the luminous light sources are controlled based on the tables.

With the configuration as described above, when light with a plain color such as any of lights with red, green, and blue lights is used for lighting an object to be measured, a current flown to any of the LEDs 33R, 33G, and 33B is controlled by the lighting control table 64 for each discrete LED shown in FIG. 5. Further when white light synthesized from red, green, and blue lights is irradiated, the current flown to each of the LEDs 33R, 33G, and 33B is controlled by using the synthesized light control table 65 shown in FIG. 6.

The light emitted from any of the LEDs 33R, 33G, and 33B is reflected by the mirror 21 within the housing 11, and then reflected by the beam splitter 22 and is irradiated through the objective 13 onto an object to be measured placed on the stage 2. The light from the measured object passes through the objective 13 and the beam splitter 22, and is magnified or reduced according to the magnification of the lens 23 with the image formed by the CCD camera 17.

The CPU 51 drives the actuator 14 based on a contrast value for each pixel image-picked up by the CCD camera 17 to displace the objective 13 in the direction along the optical axis L1 for focusing.

In this state, such parameters as the size and form of the measured object are measured from the image of the measured object image-picked up by the CCD camera 17.

Therefore, with this embodiment, a lighting control table for each discrete LED 64 stores therein data concerning the relation between the luminous intensity obtained with the optical system for lighting 31 and a current flown to each of the LEDs 33R, 33G, and 33B, so that the luminous intensity of light irradiated to an object to be measured can be controlled to the preset value by controlling the current flown to each of the LEDs 33R, 33G, and 33B based on the data concerning the luminous intensity and the currents stored in the lighting control table for each discrete LED 64.

Because of the features as described above, influence of non-uniformity of intensities of lights emitted from a plurality of luminous light sources can be suppressed with the lighting with stable luminous intensity performed, and further compatibility of the part program between image processing types of measuring devices is insured. In addition, even if the LEDs 33R, 33G, and 33B are degraded, the LEDs 33R, 33G, and 33B can be calibrated by rewriting the data in the lighting control table for each discrete LED 64 as well as in the synthesized-color lighting control table 65 by carrying out the measurement by the method shown in FIG. 7.

Especially for LEDs ranked (according to the light intensity and the chromaticity) by manufacturers for selling on the market, even if LEDs in a low rank are purchased, lighting with stable luminous intensity can be realized with a low cost.

Further the lighting system has LEDs 33R, 33G, and 33B emitting lights with red, green, and blue color respectively as the luminous light sources for the optical system for lighting 31, by selecting any of the LEDs 33R, 33G, and 33B emitting light with a desired color, or by synthesizing the lights emitted from these three LEDs 33R, 33G, and 33B, a color of light irradiated to an object to be measured can freely be changed. Thus, the lighting system can respond to various types of objects to be measured, and can fetch accurate images of the measured objects.

In addition, a plurality of data sets for currents flown to the LEDs 33R, 33G, and 33B required for keeping constant a mixing ratio of lights emitted from the LEDs 33R, 33G, and 33B to synthesize white light from the red, green, and blue lights are stored in the synthesized-color lighting control table 65 as references for different luminous intensities, and even when the luminous intensity of the synthesized white light is changed, the mixing ratio of lights emitted from the LEDs 33R, 33G, and 33B is always kept constant, so that synthesized white light with the same chromaticity (white) can always be obtained.

Chromaticity coordinates when the luminous intensity of the optical system for lighting 31 was gradually changed were measured by changing the currents flown to the LEDs 33R, 33G, and 33B and also with reference to the data shown in FIG. 6. A result of the measurement is shown in FIG. 9. It is understood also from this figure that non-uniformity of luminous intensities of the luminous light sources are suppressed with lighting realized at the stable chromaticity.

The present invention was described above with reference to a preferred embodiment thereof, but the present invention is not limited to this embodiment, and it is needless to say that various improvements and design changes can be performed without departing the gist of the present invention.

For instance, description of the first embodiment above assumed a case where the present invention was applied to the lighting with incident light for irradiating light to an object to be measured above a position just above the measured object, but this invention is not limited to this case, and can be applied to various types of lighting systems such as translucent lighting system, diagonal incident-light system, and ring lighting system.

Figure 10:
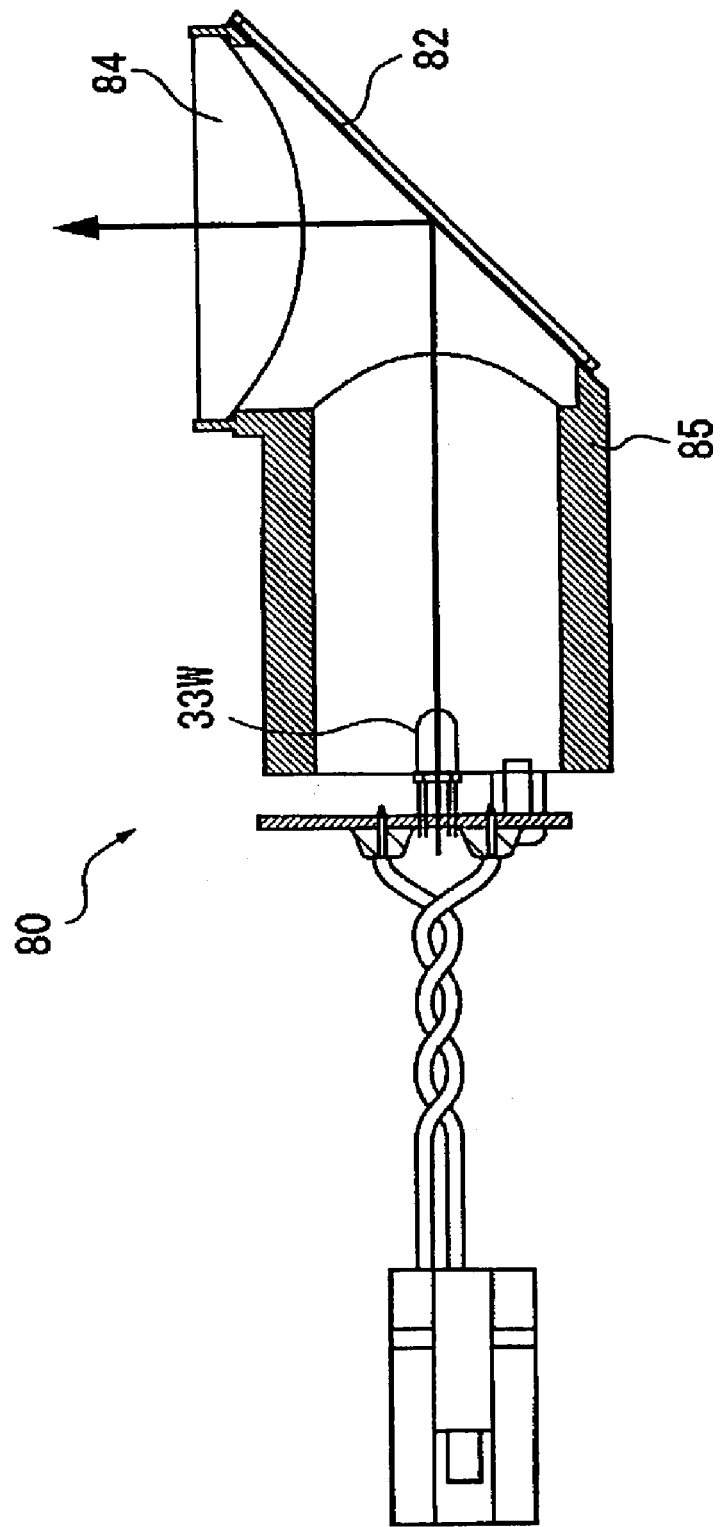
FIG. 10 is a view showing another example of the optical system for lighting according to the embodiment above.
Figures 11, 12:
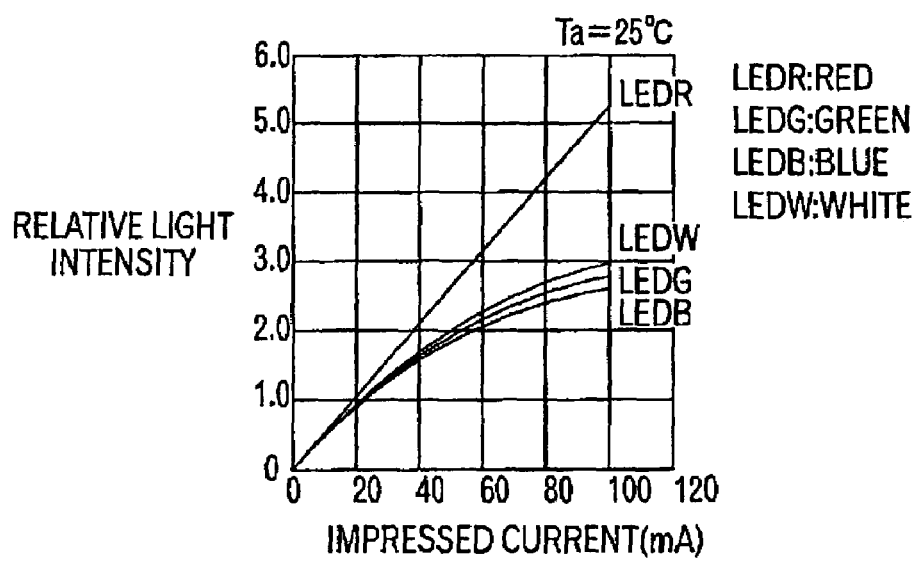
FIG. 11 is a view showing an example of the light intensity ranking and the chromaticity ranking for LEDs.
FIG. 12 is a view showing the relation between an impressed current flown to an LED and the relative intensity of light emitted then.

For the translucent lighting system, for instance, the LED unit shown in FIG. 10 may be used. This LED unit comprises a single LED 33W emitting white light, a mirror 82 for reflecting the light emitted from the LED 33W at a right angle (upward to the stage 2), a lens 84 located in the opposite side from the mirror 82, and a housing 85 for holding the components above.

In this case, a lighting control table in which data concerning the relation between a current flown to the LED 33W emitting white light and luminous intensity of the light emitted then is stored is provided, so that the current flown to the LED 33W can be controlled by referring to this lighting control table.

In the LED unit shown in FIG. 10, a plurality of LEDs each emitting white light may be used as the luminous light sources, and also LEDs emitting lights with the three colors respectively may be used.

In the first embodiment described above, the LEDs 33R, 33G, and 33B emitting lights with the three colors are provided as the luminous light sources, and synthesized white light is produced by synthesizing the lights emitted from the LEDs 33R, 33G, and 33B, but light with any color other than the white color may be produced by changing a mixing ratio of lights emitted from the LEDs 33R, 33G, and 33B.

It is not always required to prepare the LEDs 33R, 33G, and 33B emitting lights with the three colors, and an LED emitting light with a specific color or a luminous light source other than the LED, for instance, a halogen lamp may be used as the luminous light source.

Further in the first embodiment described above, the lighting control table for each discrete LED 64, in which a plurality of data sets concerning the luminous intensity obtained with the optical system for lighting 31 when all of the LEDs 33R, 33G, and 33B are lit and the impressed currents flown to the LEDs 33R, 33G, and 33B then are stored as references for different luminous intensities (W10 to W100), is provided for each of the LEDs 33R, 33G, and 33B, or the synthesized-color lighting control table 65, in which a plurality of data sets concerning the currents flown to the LEDs 33R, 33G, and 33B so that the mixing ratio of lights emitted from the LEDs 33R, 33G, and 33B is kept constant to synthesize light with a synthesized color (synthesized white color) from the red, green, and blue lights are stored as references for different luminous intensities (W10 to W100) of the synthesized white light is used, but the relations may be stored as approximate expressions or a graph.

In the first embodiment, the optical system for lighting 31 is connected via an optical fiber or the like to the light inlet tube 18 in the housing 11, but the optical system for lighting 31 may be directly fixed to the light inlet tube 18 in the housing 11.

Further in the first embodiment, the objective 13 is moved by the actuator 14 in the direction along the optical axis L1 toward the housing 11, but the entire optical system for lighting 3 shown in FIG. 2 may be moved by, for instance, a motor in the direction along the optical axis L1.

It is to be noted that the present invention may be applied, not only to the image processing type of measuring device based on the structure described in the first embodiment, but also to other types of optical measuring devices such as a microscope, a projector, and a three-dimensional image measuring device.

A second embodiment of the present invention is described below.

Figure 13:
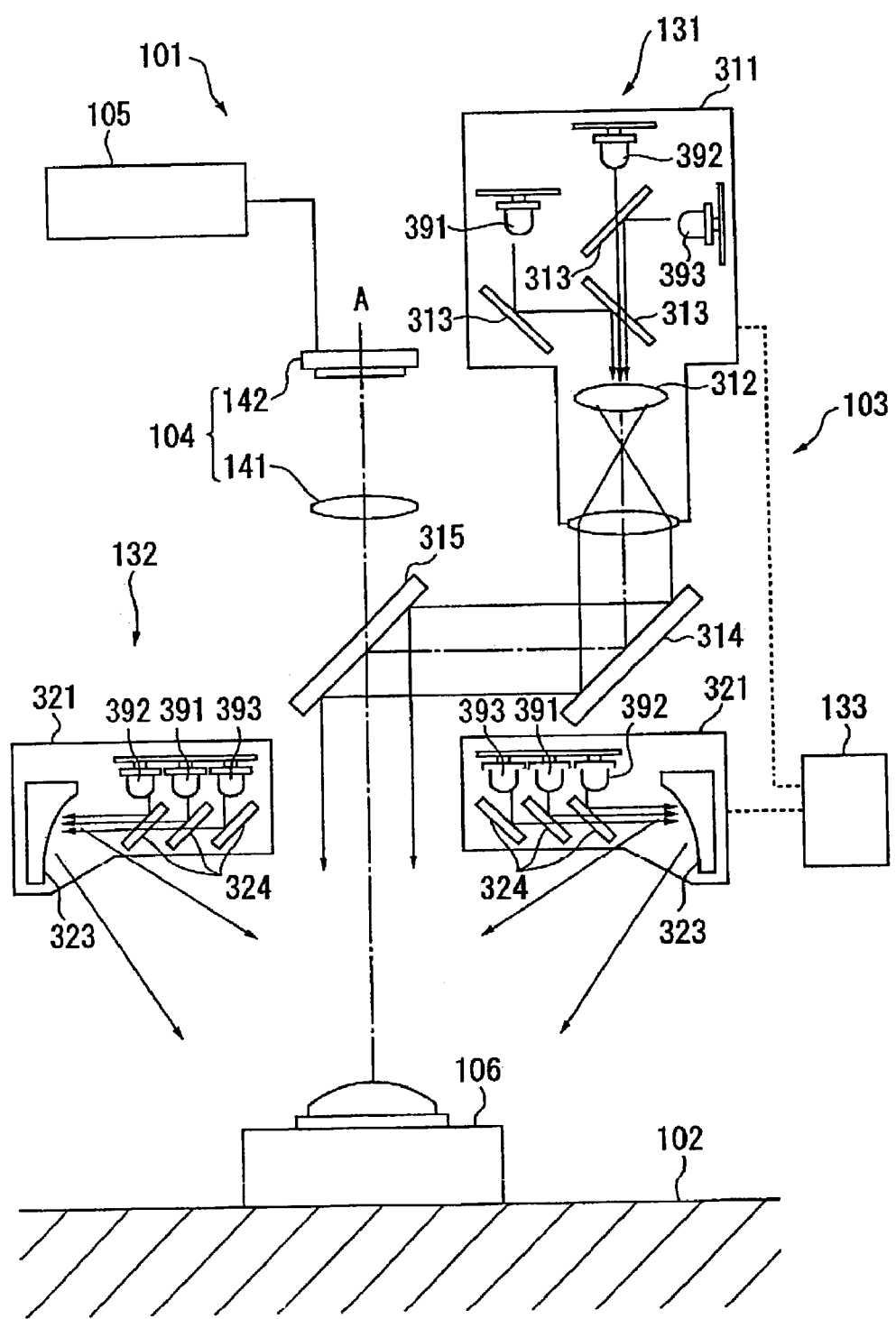
FIG. 13 is a view showing an image processing type of measuring device according to a second embodiment of the present invention.

FIG. 13 shows an image processing type of measuring device 101 as a measuring device having the lighting system according to the present invention.

This measuring device 101 comprises a lighting system 103 for irradiating light to an object to be measured (not shown) placed on a stage 102, an image pick-up unit 104 for receiving the reflected light from the measured object, and a image processing unit 105 for measuring a form of an object to be measured from an image obtained with the image pick-up unit 104. In FIG. 13, a color luminous intensity meter 106 for measuring luminous intensity and chromaticity of lighting is placed on the stage 102 in place of an object to be measured.

The lighting system 103 comprises an incident-light lighting system 131 for irradiating light from a position just above an object to be measured, a ring lighting system 132 for irradiating a ring-formed light beam centering on the optical axis A connecting the measured object to the image pick-up unit 104, and a lighting control unit 133.

The incident-light lighting system 131 comprises a housing 311, an LED 391 emitting light with red, an LED 392 emitting light with green, and an LED 393 emitting light with blue as luminous light sources accommodated within the housing 311, a lens 312 for condensing and synthesizing lights emitted from the luminous light sources, and a dichroic mirror 313 leading the lights emitted from the luminous light sources to the lens 312 respectively. The dichroic mirror 313 allows passage or reflects light according to the wavelength, and efficiently leads the lights from the luminous light sources to the lens 312 for synthesizing the lights by selectively allowing passage or reflecting the lights emitted from the luminous light sources. The synthesized light from the incident-light lighting system 131 is reflected by the mirror 314 in the direction along the optical axis A and then is reflected by a half-mirror 315 provided on the optical axis A toward an object to be measured.

There are provided a plurality of LEDs 391 each emitting light with red, LEDs 392 each emitting light with green, and LEDs 393 each emitting light with blue respectively, and the term LED indicates a group of LEDs emitting the same light in the following description.

The ring lighting system 132 comprises a ring-formed housing 321 centering on the optical axis A; the LED 391 emitting light with red, LED 392 emitting light with green, and LED 393 emitting light with blue accommodated within the housing 321 as luminous light sources; a reflection mirror 323 for reflecting light emitted from each of the luminous light sources to an object to be measured, and a dichroic mirror 324 leading the light emitted from each of the luminous light sources to the reflection mirror 323. The LED 391 emitting light with red, LED 392 emitting light with green, and LED 393 emitting light with blue as luminous light sources are arranged in a ring form around the optical axis A. The dichroic mirror 324 reflects light from each of the luminous light sources to the direction opposite to the optical axis A. The reflection mirror 323 reflects the light from the dichroic mirror 324 to an object to be measured.

Figure 14:
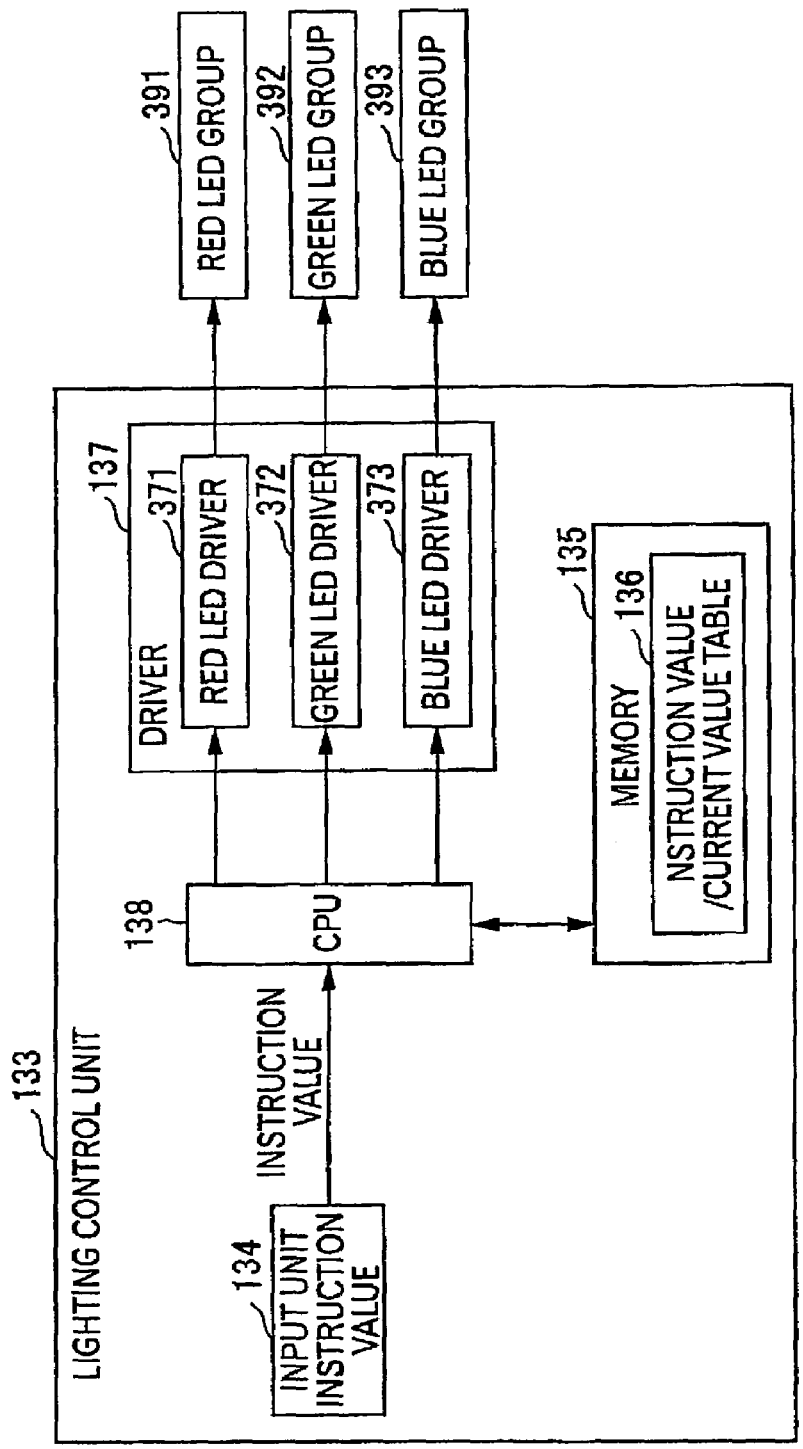
FIG. 14 is a view showing configuration of a lighting control unit according to the second embodiment of the present invention above.

The lighting control unit 133 comprises, as shown in FIG. 14, an input unit 134 for setting and inputting an instruction value for instructing luminous intensity of lighting, a memory (an instruction value/current value table storing device) 35 for storing therein an instruction value/current value table 136 in which data sets concerning the relations between instruction values and values of impressed currents to the luminous light source groups 391 to 393 are stored, a driver 137 for impressing a current to each of the luminous light sources, and a central processing unit (CPU) 138. Herein the memory 135, driver 137, and CPU 138 forms an impressed current control unit. The input unit 134 comprises levers or buttons or the like which are provided so that the levers or buttons or the like can manually be operated from the outside. The instruction value set and inputted with the inputting unit 134 is sent to the CPU 138.

The instruction value/current value table 136 is, as shown in FIG. 15, a table in which values of currents to be impressed to each LED group among a group of LEDs 391 each emitting light with red, a group of LEDs 392 each emitting light with green, and a group of LEDs 393 each emitting light with blue are stored in correlation to the instruction values. The instruction value/current value table 136 is prepared by calibrating the luminous intensity characteristics of each of the LED groups 391 to 393, chromaticity characteristics and the individual difference of each product to compute a value of a current impressed to each of the group of LEDs 391 each emitting light with red, group of LEDs 392 each emitting light with green, and group of LEDs 393 each emitting light with blue for the purpose to provide white light which is synthesized light with the luminous intensity instructed by an instruction value. There is no specific restriction over the chromaticity of the synthesized light, but white synthesized light with the CIE 1931 chromaticity coordinates (0.3, 0.3) is assumed in the following description.

Preparation of the instruction value/current value table 136 is described below.

The CPU 138 reads out, according to an instruction value instructed from the input unit 134, impressed current values corresponding to an instruction value instructed from the instruction value/current value table 136 stored in the memory 135 for each of the group of LEDs 391 each emitting light with red, group of LEDs 392 each emitting light with green, and group of LEDs 393 each emitting light with blue. The CPU 138 sends the read-out instruction value to the driver 137.

The CPU 138 comprises a luminous light source characteristics measuring device, a mixing ratio computing unit, luminous intensity computing unit, an impressed current reader or the like, and operations of each of the units is described hereinafter with reference to the flow chart.

The driver 137 impresses a current to each of the LED groups 391 to 393 to make the LED emit light, and comprises a red LED driver 371 for impressing a current to each of the LEDs 391 emitting light with red, a green LED driver 372 for impressing a current to each of the LEDs 392 emitting light with green, and a blue LED driver 373 for impressing a current to each of the LEDs 393 each emitting light with blue. The driver 137 impresses currents from the drivers 371 to 373 upon an instruction for the impressed current value from the CPU 138.

The image pick-up unit 104 comprises an image pick-up lens 141 for condensing reflected light from an object to be measured, and a CCD camera 142 having an image pick-up element for picking up light from the image pick-up lens 141.

Next, the instruction value/current value table preparing step of preparing the instruction value/current value table 136 is described.

For preparing the instruction value/current value table 136, at first a color illuminometer is installed as a luminous intensity/chromaticity sensor for measuring luminous intensity and chromaticity of lighting on the stage 102. The data for luminous intensity and chromaticity of lighting measured with the color luminous intensity meter 106 is transmitted to the CPU 138.

Figure 16:
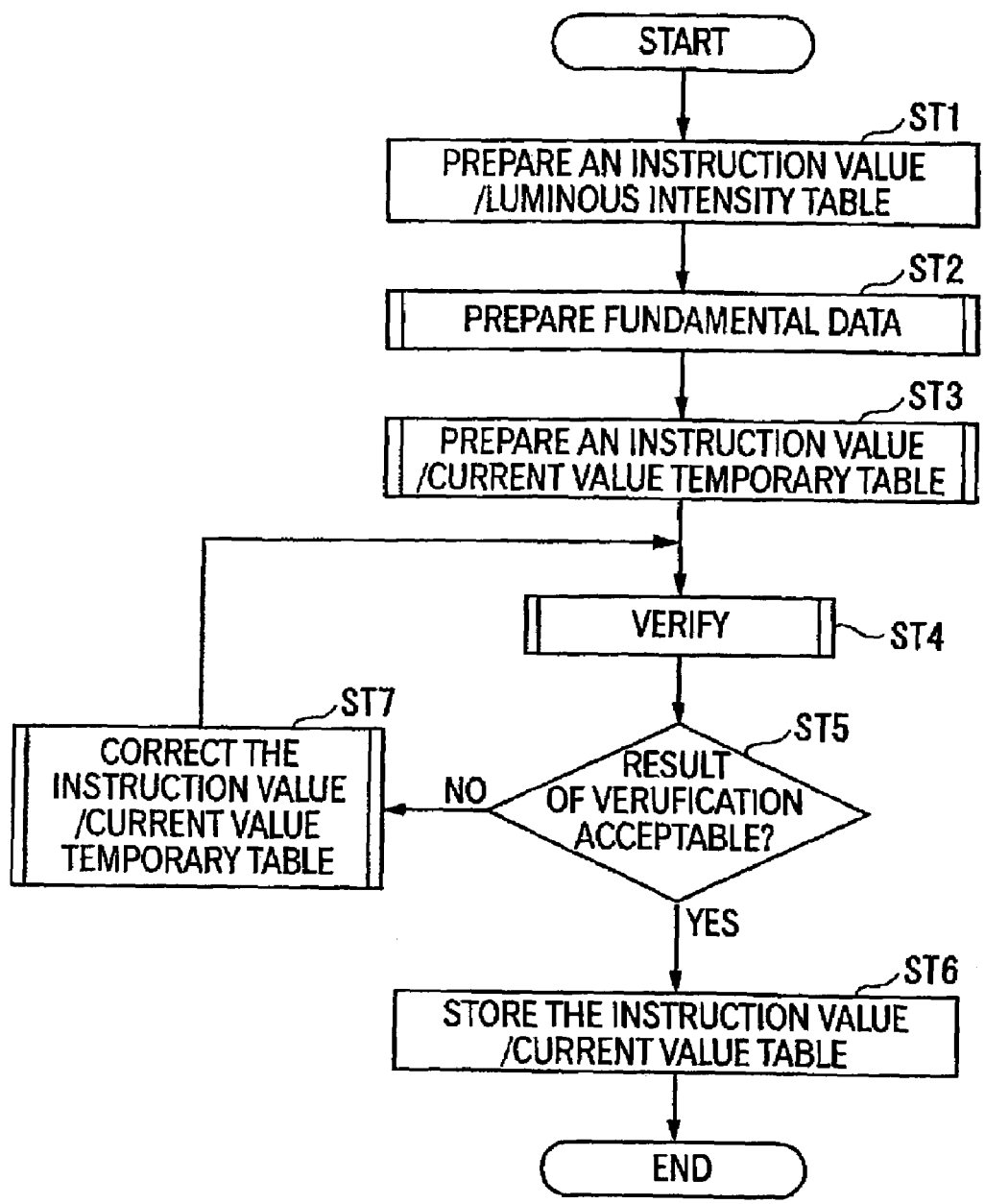
FIG. 16 is a flow chart showing an instruction value/current value table preparing step of preparing the instruction value/current value table shown in FIG. 15.

The instruction value/current value table preparing step for preparing the instruction value/current value table 136 comprises, as shown in the flow chart shown in FIG. 16, an instruction value/luminous intensity table preparing step ST1 of setting luminous intensity of lighting to an instruction value, an fundamental data preparing step ST2 of fetching data concerning luminous intensity and chromaticity characteristics of each LED group as fundamental data, an instruction value/current value table preparing step ST3 of preparing a temporary table for instruction values/current values indicating a relation between an instruction value based on the characteristics of each of the LED groups 391 to 393 fetched in the fundamental data preparing step ST2 and the luminous intensity instruction by the instruction value, a verifying step ST4 of verifying the instruction value/current value temporary table, and a correcting step ST7 of correcting the instruction value/current value temporary table based on a result of correction in the verifying step ST4.

Each of the steps is programmed, and is executed when the program runs in the CPU 138.

The instruction value/luminous intensity table preparing step ST1 is described below.

Figures 17A, 17B:
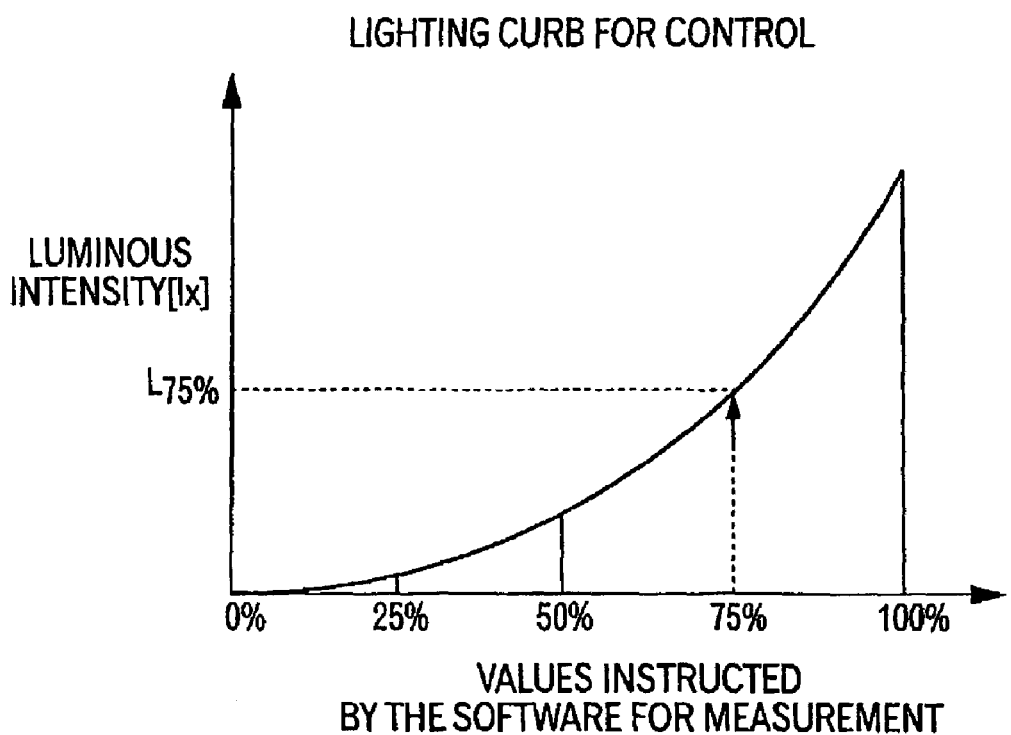

The relation between an instruction value (%) and luminous intensity (Lx) is expressed by a control curb plotted an instruction value as the horizontal axis and luminous intensity as the vertical axis in which luminous intensity is decided to an instruction value as shown in FIG. 17A. The relation may previously be stored in the CPU 138, or may be anew with the input device 134. Then luminous intensity corresponding to an instruction value is read out from the control curb, and the instruction/luminous intensity table in which luminous intensity is correlated to one instruction value is prepared as shown in FIG. 17B.

The fundamental data preparing step ST2 is described below.

Figure 18:
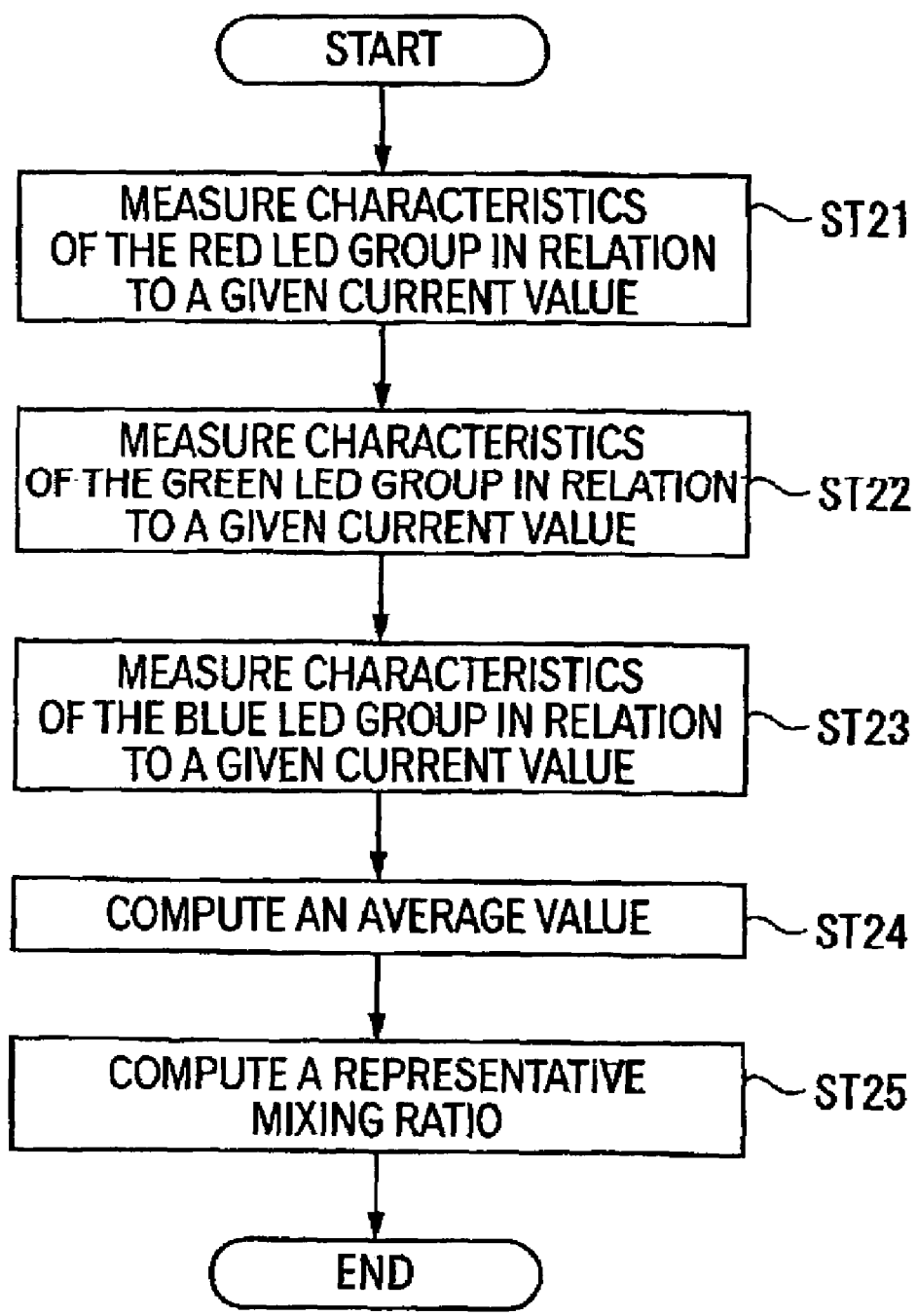
FIG. 18 is a flow chart showing a fundamental data preparing step in the second embodiment.

The fundamental data preparing step ST2 comprises, as shown in the flow chart in FIG. 18, a step ST21 of measuring the relation between impressed current values and characteristics of the group of LEDs 391 each emitting light with red; a step ST22 of measuring the relation between impressed current values and characteristics of the group of LEDs 392 each emitting light with green; a step ST23 of measuring the relation between impressed current values and characteristics of the group of LEDs 393 each emitting light with blue; a step ST24 of computing an average value of chromaticity for the LEDs 391 to 393 (average chromaticity computing step); and a step ST25 of computing a representative mixing ratio (representative mixing ratio computing step) for producing the so-called synthesized light, namely synthesized light with the CIE 1931 chromaticity coordinates (0.3, 0.3) according to the average chromaticity.

Now the step ST21 of measuring a relation between an impressed current value and characteristics of the group of LEDs 391 each emitting light with red is described below.

When checking the characteristics of the group of LEDs 391 each emitting light with red, the CPU 138 sends an instruction for sequentially raising the impressed current from 0 to the red LED driver 371. Then a current is impressed sequentially from 0 from the red LED driver 371 to the group of LEDs 391 each emitting light with red and the group of LEDs 391 each emitting light with red emits light in correspondence to the impressed current value. Then the color luminous intensity meter 106 measures the luminous intensity and chromaticity of lighting from the group of LEDs 391 each emitting light with red. A result of measurement is sent to the CPU 138. The CPU 138 stores therein data concerning the relation between the luminous intensity and the chromaticity for the impressed current for the group of LEDs 391 each emitting light with red. This relation is stored as a relation between the chromaticity coordinates (x, y) and the luminous intensity of the group of LEDs 391 each emitting light with red for the impressed current value as shown in FIG. 19.

When measurement for current values in the effective range (for instance, 65536 in a case of 16-bit control) for the group of LEDs 391 each emitting light with red, measurement is performed for the group of LEDs 392 each emitting light with green and for the group of LEDs 393 each emitting light with blue (steps ST22 and ST23), and the table for relations among the impressed current value, luminous intensity, and chromaticity as shown in FIG. 19 are prepared as a result of measurement.

It is to be noted that the luminous light source characteristics measuring step comprises the steps ST21, ST22, and ST23.

Then an average value of the chromaticity is computed for each of the LED groups 391 to 392 (ST24). Namely, a value obtained by averaging chromaticity values measured for each impressed current is computed for each of the LED groups 391 to 393. The average chromaticity values for each of the LED groups 391 to 393 are shown in the lowest column in FIG. 19.

Then a representative mixing ratio is computed (ST25). The representative mixing ratio is a ratio of luminescence intensities of the LED groups for synthesizing the CIE1931 synthesized color with the chromaticity coordinates (0.3, 0.3), namely the group of LEDs 391 each emitting light with red, the group of LEDs 392 each emitting light with green, and the group of LEDs 393 each emitting light with blue assuming that the luminescence chromaticity of the LEDs 391 to 393 is the average chromaticity.

The mixing ratio for synthesizing a synthesized color (x, y, E) can be computed through the equation for color synthesis. The theory for color synthesis is described below.

Intensity of luminescence is expressed by E. Further it is assumed herein that the CIT value for the group of LEDs 391 each emitting light with red is $(X_R, Y_R, E_R)$, the CIE value for the group of LEDs 392 each emitting light with green is $(X_G, Y_G, E_G)$, and the CIE value for the group of LEDs 393. each emitting light with blue is $(X_B, Y_B, E_B)$.

The synthesized color produced then is expressed by the following expression:

$$x = \frac{x_R T_R + x_G T_G + x_B T_B}{T_R + T_G + T_B} \quad \text{(Expression 1)}$$

$$y = \frac{y_R T_R + y_G T_G + y_B T_B}{T_R + T_G + T_B}$$

$$E = y_R T_R + y_G T_G + y_B T_B$$

wherein

-continued
$$T_R = \frac{E_R}{y_R}, \quad T_G = \frac{E_G}{y_G}, \quad T_B = \frac{E_B}{y_B}$$

The $T_R$, $T_G$, and $T_B$ are obtained from the expression 1 as shown below:

$$T_R = \frac{x(y_G - y_B) + y(x_B - x_G) + x_G y_B - x_B y_G}{D} \cdot E \quad \text{(Expression 2)}$$

$$T_G = \frac{x(y_B - y_R) + y(x_R - x_B) + x_B y_R - x_R y_B}{D} \cdot E$$

$$T_B = \frac{x(y_R - y_G) + y(x_G - x_R) + x_R y_G - x_G y_R}{D} \cdot E$$

wherein $$D = y(x_B y_R - x_G y_R + x_R y_G - x_B y_G + x_G y_B - x_R y_B)$$

Therefore the intensity of lights emitted from the LED groups 391 to 393 for synthesizing the synthesized color (x, y, E) is expressed as shown below:

$$E_R = y_R \cdot T_R \quad \text{(Expression 3)}$$
$$= y_R \cdot \frac{x(y_G - y_B) + y(x_B - x_G) + x_G y_B - x_B y_G}{D} \cdot E$$

$$E_G = y_G \cdot T_G$$
$$= y_G \cdot \frac{x(y_B - y_R) + y(x_R - x_B) + x_B y_R - x_R y_B}{D} \cdot E$$

$$E_R = y_B \cdot T_B$$
$$= y_B \cdot \frac{x(y_R - y_G) + y(x_G - x_R) + x_R y_G - x_G y_R}{D} \cdot E$$

wherein $$D = y(x_B y_R - x_G y_R + x_R y_G - x_B y_G + x_G y_B - x_R y_B)$$

The mixing ratio ($r_R$, $r_G$, $r_B$) for synthesizing the chromaticity coordinates (x, y) for synthesized lighting is obtained from a ratio among the intensities $E_R$, $E_G$, and $E_B$ of lights emitted from the LED groups 391 to 393.

Then, assuming that the average chromaticity for the group of LEDs 391 each emitting light with red is ($X_{Rave}$, $Y_{Rave}$), the group of LEDs 392 each emitting light with green is ($X_{Gave}$, $Y_{Gave}$), and the group of LEDs 393 each emitting light with blue is ($X_{Bave}$, $Y_{Bave}$), the representative mixing ratio ($r_{Rave}$, $r_{gave}$ and $r_{Bave}$) for synthesizing the synthesized color with the CIE1931 chromaticity coordinates (0.3, 0.3, 1) is computed by the CPU 138 through the expression 3.

Next the instruction value/current value temporary table step ST3 is described.

Figure 20:
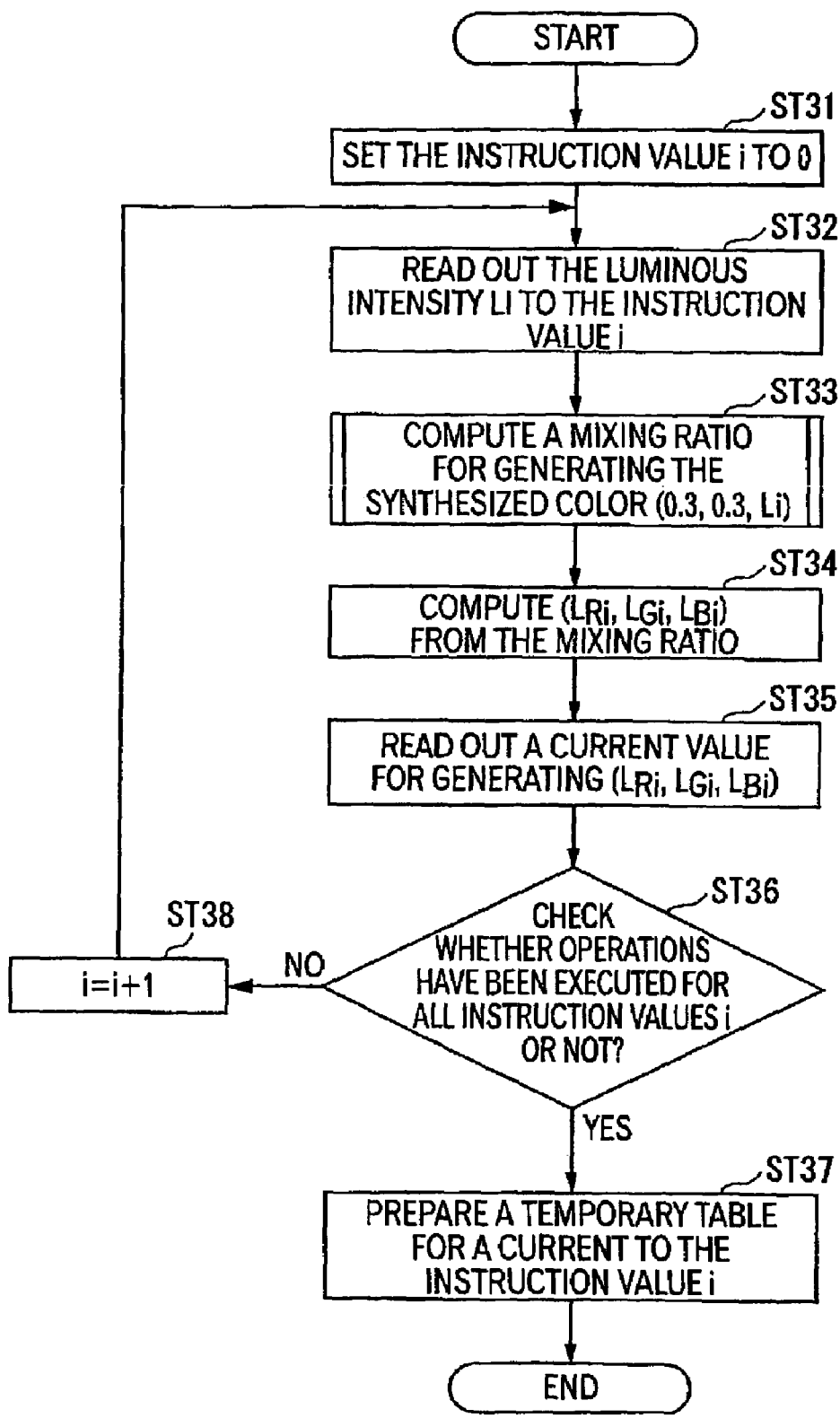
FIG. 20 is a flow chart showing the instruction value/current temporary value table preparing step in the second embodiment.

The instruction value/current value temporary table preparing step (FIG. 16, step 3) comprises, as shown in FIG. 20, a mixing ratio computing step ST33 of computing a mixing ratio for producing the synthesized color (0.3, 0.3, Li), luminous intensity computing step ST34 of computing luminous intensity of each of the LED groups 391 to 393 from the mixing ratio computed in the mixing ratio computing step ST33, and a current value read-out step ST35 of reading out an impressed current value for making each of the LED groups 391 to 393 emit light at the luminous intensity computed in the luminous intensity computing step (impressed current value read-out step).

In the instruction value/current value temporary table preparing step ST3, at first the luminous intensity Li for the instruction i is read out from the instruction value/luminous intensity table (Refer to FIG. 17B) (ST32). In this step, at first the counter i for the instruction value i is initialized to zero (ST31). When the operations from ST32 to ST35 have been executed, the counter i is sequentially counted up 1 by 1 (ST38), and the operations from ST32 to ST35 are executed for all of the instruction values i (ST36).

Next, the mixing ratio computing step (ST33) is described.

Figure 21:
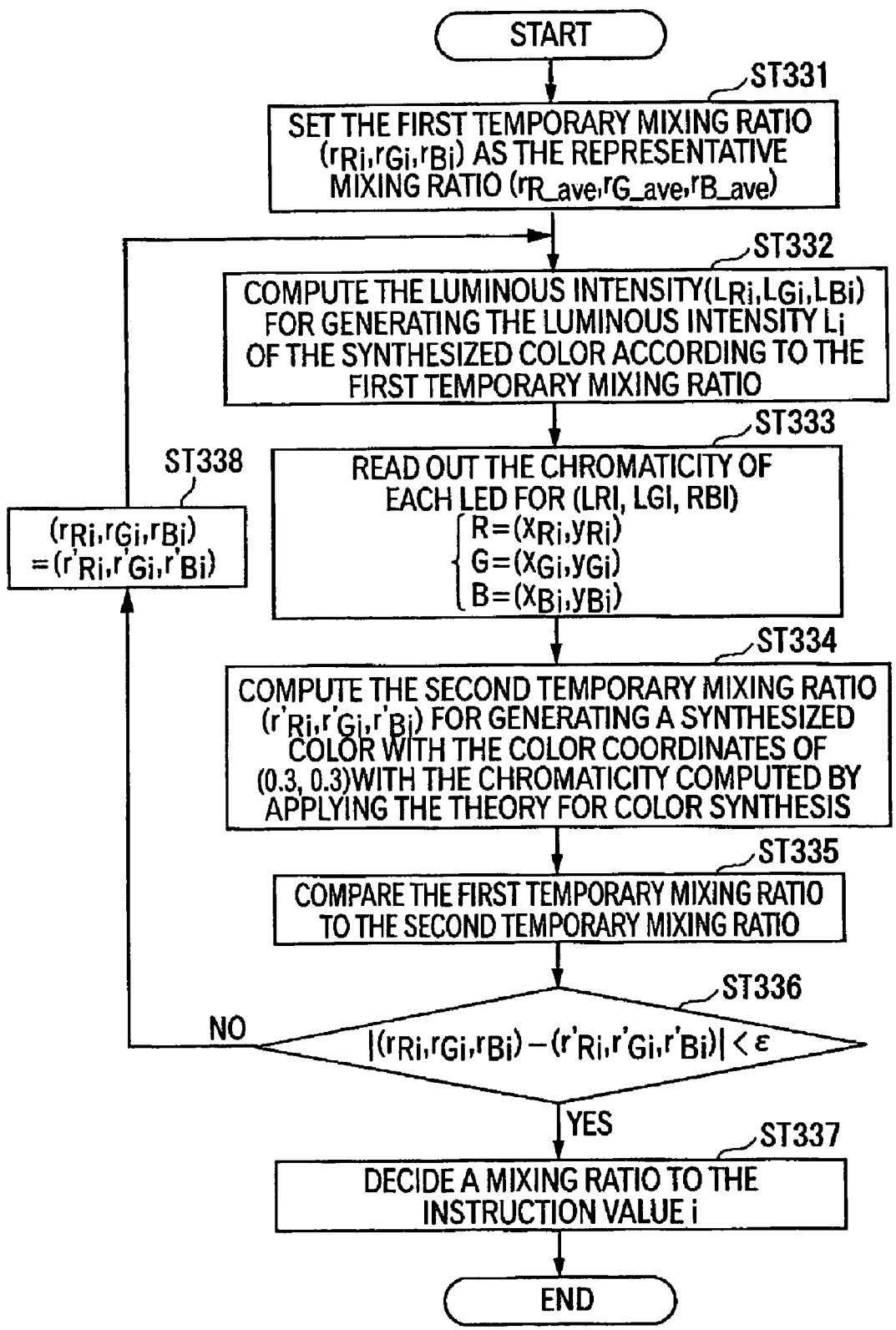
FIG. 21 is a flow chart showing a mixing ratio computing step in the second embodiment.

The mixing ratio computing step ST33 comprises, as shown in FIG. 21, a first temporary mixing ratio setting step ST331 of setting a temporary mixing ratio of intensities of lights emitted from the LED groups 391 to 393 as a first temporary mixing ratio; a temporary luminous intensity computing step ST332 of computing luminous intensity of each of the LED groups 391 to 393 required for synthesizing synthesized light at the preset luminous intensity according to the first temporary mixing ratio; a chromaticity read-out step ST333 of reading out chromaticity of light emitted from each of the LED groups 391 to 393 at the luminous intensity of each of the LED groups 391 to 393 computed in the temporary luminous intensity computing step ST332; a second temporary mixing ratio computing step ST334 of computing a mixing ratio of intensities of lights emitted from the LED groups 391 to 393 required for the synthesized light with the preset chromaticity read out in the chromaticity read-out step ST333 as a second temporary mixing ratio; a temporary mixing ratio comparing step ST335 of comparing the first temporary mixing ratio to the second temporary mixing ratio; and a temporary mixing ratio resetting step ST338 of resetting the second temporary mixing ratio as a first temporary mixing ratio based on a result of comparison in the temporary mixing ratio comparing step ST335.

In the first temporary mixing ratio setting step ST331, at first the first temporary mixing ratio ($r_{Ri}$, $r_{Gi}$, $r_{Bi}$), which is a ratio of intensities of the lights emitted from the LED groups 391 to 393, is temporarily set in the representative mixing ratio ($r_{Rave}$, $r_{Gave}$, $r_{Bave}$).

In the temporary luminous intensity computing step ST332, the luminous intensities ($L_{Ri}$, $L_{Gi}$, $L_{Bi}$) of the LED groups 391 to 393 required for producing synthesized light at the luminous intensity Li according to the first temporary mixing ratio. In this step, luminous intensity of each of the LED groups 391 to 393 is computed through the following expression:

$$L_{Ri} = r_{Ri} Li$$

$$L_{Gi} = r_{Gi} Li$$

$$L_{Bi} = r_{Gi} Li \quad \text{(Expression 4)}$$

In this step, the first temporary mixing ratio is set in the representative mixing ratio (ST331). The representative mixing ratio is set as a mixing ratio required for synthesizing light with the CIE1931 chromaticity coordinates (0.3, 0.3) assuming that the chromaticity of each of the LED groups 391 to 393 is always kept constant regardless of the intensity of emitted light. Therefore, when each of the LED groups 391 to 393 is made to emit light at ($L_{Ri}$, $L_{Gi}$, $L_{Ri}$), the luminous intensity is set to Li, but the actual chromaticity changes due to difference in the intensity of emitted light, so that sometimes chromaticity of synthesized light may be off from the CIE1931 chromaticity coordinates (0.3, 0.3).

In the chromaticity read-out step ST333, the chromaticity of light emitted when each of the LED groups 391 to 393 emits lights at the luminous intensity ($L_{Ri}$, $L_{Gi}$, $L_{Bi}$) computed in the temporary luminous intensity computing step ST332. The chromaticity obtained at the luminous intensity is read out from the table storing therein data concerning the relations between impressed current values, chromaticity, and chromaticity prepared in the fundamental data preparing step ST2 (See FIG. 19).

It is assumed herein that the read-out data for the group of LEDs 391 each emitting light with red, the group of LEDs 392 each emitting light with green, and the group of LEDs 393 each emitting light with blue is as follows:

Chromaticity of light emitted from the group of LEDs 391 each emitting light with red, R=($X_{Ri}$, $Y_{Ri}$)

Chromaticity of light emitted from the group of LEDs 392 each emitting light with green, R=($X_{Gi}$, $Y_{Gi}$)

Chromaticity of light emitted from the group of LEDs 393 each emitting light with blue, B=($X_{Bi}$, $Y_{Bi}$).

When the read-out value for chromaticity is off from the average chromaticity, the mixing ratio required for synthesizing light with this chromaticity coordinates (0.3, 0.3) may be off from the first mixing ratio (representative mixing ratio in this step).

In the second temporary mixing ratio computing step ST334, a mixing ratio required for producing synthesized light with the chromaticity read out in the chromaticity read-out step ST333, namely the light with the CIE1931 chromaticity coordinates (0.3, 0.3) is computed as a second temporary mixing ratio ($r_{Ri'}$, $r_{Gi'}$, $r_{Bi'}$).

The intensities of lights emitted from the LED groups 391 to 393 required for producing synthesized light with the chromaticity of (0.3, 0.3), namely $E_R$, $E_G$, and $E_B$ are computed through the equation 3. Therefore, the second temporary mixing ratio ($r_{Ri'}$, $r_{Gi'}$, $r_{Bi'}$) is computed as a ratio of ($E_R$, $E_G$, $E_B$).

In the temporary mixing ratio computing step ST335, the first temporary mixing ratio is compared to the second temporary mixing ratio. Each component of the first temporary mixing ratio is compared to each component of the second temporary mixing ratio.

In the theory of color synthesis, computing is performed based on the chromaticity when light emission is performed according to the first temporary mixing ratio to compute a second temporary mixing ratio, but actually chromaticity changes non-linearly in association with change in luminous intensity, so that, even when synthesized light is produced according to the second temporary mixing ratio, the chromaticity may be off from the CIE1931 chromaticity coordinates (0.3, 0, 3). To overcome this problem, in ST338, processing for convergence is performed repeatedly by resetting the second temporary mixing ratio as a first temporary mixing ratio, and a degree of convergence is assessed in the temporary mixing ratio comparing step ST335.

In the temporary mixing ratio comparing step ST335, differences between each component of the first temporary mixing ratio ($r_{Ri}$, $r_{Gi}$, $r_{Bi}$) and the corresponding one of the second temporary mixing ratio ($r_{Ri'}$, $r_{Gi'}$, $r_{Bi'}$) are compared to the respective references $\epsilon$. When the difference between one component and the corresponding one is less than the preset reference $\epsilon$ (ST336, YES), namely when the relational expression 5 shown below is satisfied, the second temporary mixing ratio is set as a temporary mixing ratio for the instruction value i. Herein the reference $\epsilon$ is a difference between the first temporary mixing ratio and the second temporary mixing ratio in which a change in chromaticity caused by change in luminous intensity is within the allowable range.

$$|r_{Ri} - r_{Ri'}| < \epsilon$$
$$|r_{Gi} - r_{Gi'}| < \epsilon$$
$$|r_{Bi} - r_{Bi'}| < \epsilon \quad \text{(Expression 5)}$$

When the relational expression 5 is not satisfied (ST336: NO), the second temporary mixing ratio is reset as the first temporary mixing ratio (ST338), and the operations from ST332 to ST335 is repeated until the difference between the first temporary mixing ratio and the second temporary mixing ratio is converged to satisfy the relational expression 5.

Then in the luminous intensity computing step (FIG. 20, ST24), the luminous intensities of lights ($L_{Ri}$, $L_{Gi}$, $L_{Bi}$) emitted the LED groups 391 to 393 required for synthesized lighting at the luminous intensity $L_i$ is computed according to the temporary mixing ratio. This computing is performed by using the equation 4.

In the current value read-out step ST35, impressed current values required to make each of the LED groups 391 to 393 emit light at the luminous intensity computed in the luminous intensity computing step ST34 are read out from FIG. 19, and are stored as those for the LED groups 391 to 393 in response to the instruction value i.

Operations in ST32 to ST35 are executed for all instruction values i, namely for all of the counter i in the effective range (ST36: YES), and current values in response to the instruction value i for each LED are stored to form the instruction value/current value temporary table (ST37).

Then the verifying step is performed to actually verify the instruction value/current value temporary table (FIG. 16, ST4). Namely synthesized lighting is provided according to the instruction value/current value temporary table, and whether the chromaticity of the lighting is CIE1931 chromaticity coordinates (0.3, 0.3) or not is verified.

Figure 22:
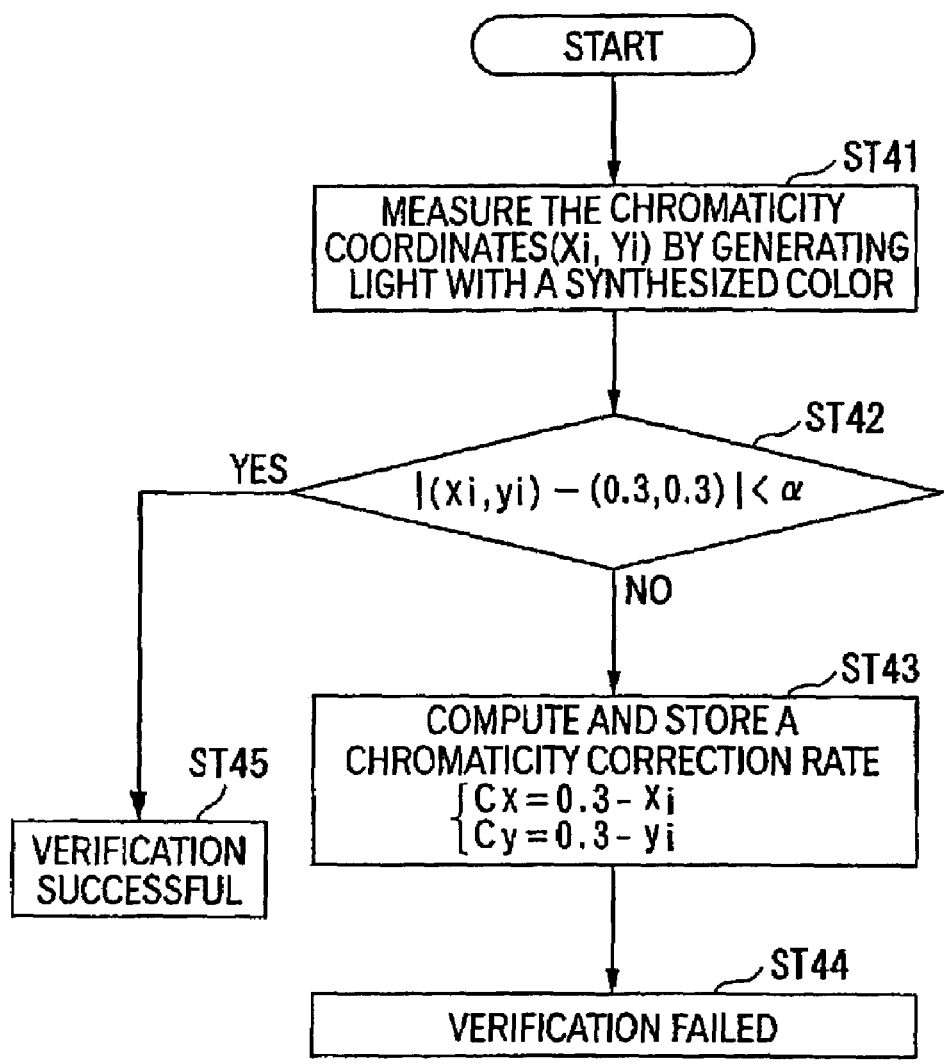
FIG. 22 is a flow chart showing a verifying step in the second embodiment.

The verifying step ST4 comprises, as shown in FIG. 22, a verifying/measuring step ST41 for actually providing synthesized lighting and measuring the chromaticity; the verifying/comparing step ST42 for comparing the measured chromaticity to the target chromaticity; and the chromaticity correction rate storing step ST43 for storing the difference between the measured chromaticity as a result of comparison in the verifying/comparing step ST42 and the target preset chromaticity.

In the verifying/measuring step ST41, synthesized lighting is provided according to the instruction value/current value temporary table. In this step, there is no specific restriction over the luminous intensity, and synthesized lighting is provided by selecting an appropriate instruction value i. Then chromaticity of the provided synthesized lighting ($x_i$, $y_i$) is measured.

Figure 23A:
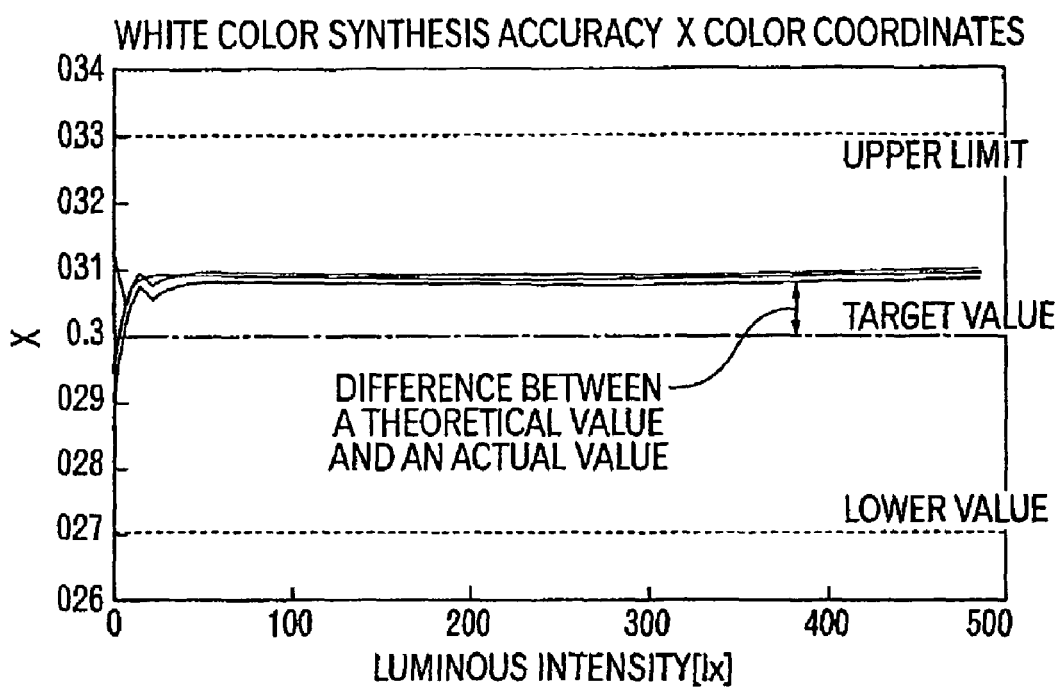
FIGS. 23A and 23B are views showing a difference between a theoretical value and an actual value in the second embodiment.
Figure 23B:
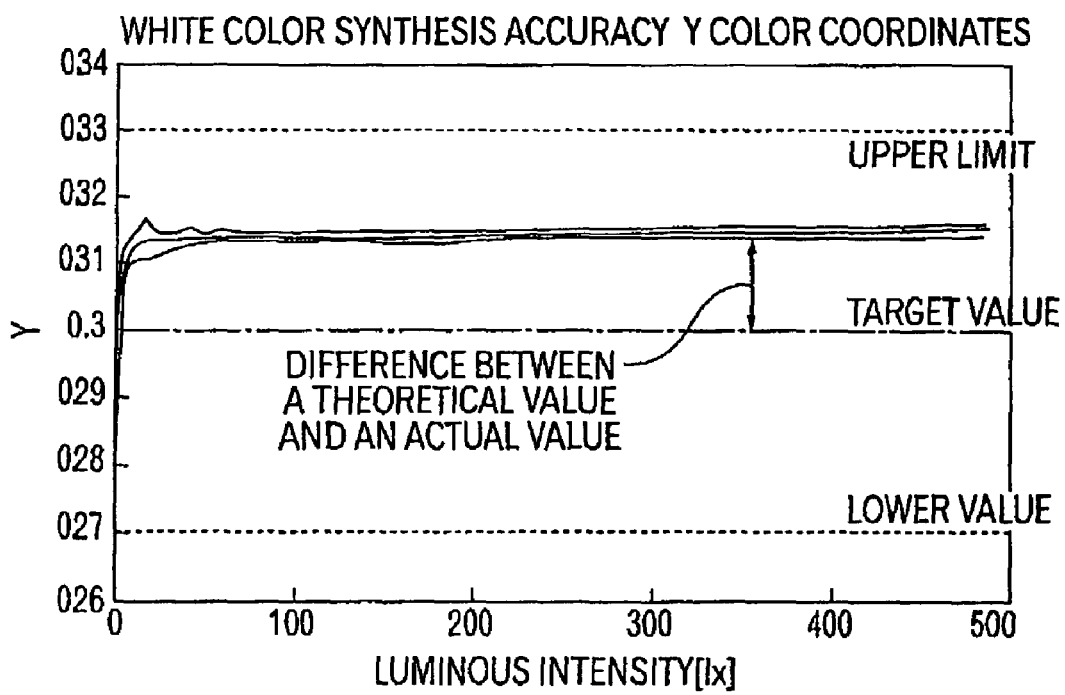

Herein, the instruction value/current value temporary table is prepared to set the chromaticity of synthesized lighting to the CIE1931 chromaticity coordinates (0.3, 0.3) by means of computing based on the theory for color synthesis. However, even when the theory for color synthesis is applied by specifying the target chromaticity of synthesized lighting to the CIE1931 chromaticity coordinates (0.3, 0.3), there may be a difference between the theoretical value and the actual chromaticity (Refer to FIG. 23)

In the verifying/comparing step ST42, the measured chromaticity and the target chromaticity coordinates (0.3, 0.3) are compared to each other for each component with reference to the preset allowance α. When the difference for a component is less than the preset allowance a (ST42: YES), namely when the relational expression 6 shown below is satisfied, chromaticity of the synthesized lighting provided according to the instruction value/current value temporary table is within the allowable range, and it is determined that a result of verification is OK (ST45). Herein the preset allowance α is a color difference not affecting a result of measurement when an object to be measured is measured by means of image processing.

$|x_i - 0.3| < \alpha$ $|y_i - 0.3| < \alpha$ (Expression 6)

When a result of verification is OK (ST45), the instruction value/current value temporary table is stored as a regular instruction value/current value table (instruction value/current value table storing step, FIG. 16, ST6).

On the other hand, when the relational expression 6 is not satisfied, a chromaticity correction rate for each component is stored as a chromaticity correction rate (ST43). Namely the chromaticity correction rate ($C_x$, $C_y$) is expressed by the following expression:

$C_x = 0.3 - x_i$ $C_y = 0.3 - y_i$ (Expression 7)

The chromaticity correction rate indicates the difference between a target chromaticity computed by applying the theory for color synthesis and the chromaticity of synthesized lighting actually provided, so that it can be considered that the chromaticity of synthesized lighting actually provided will match the target value by adjusting the target chromaticity by the chromaticity correction rate when computing based on the theory for color synthesis.

After the chromaticity correction rate is stored, the instruction value/current value temporary table is corrected (FIG. 16, ST7).

Figure 24:
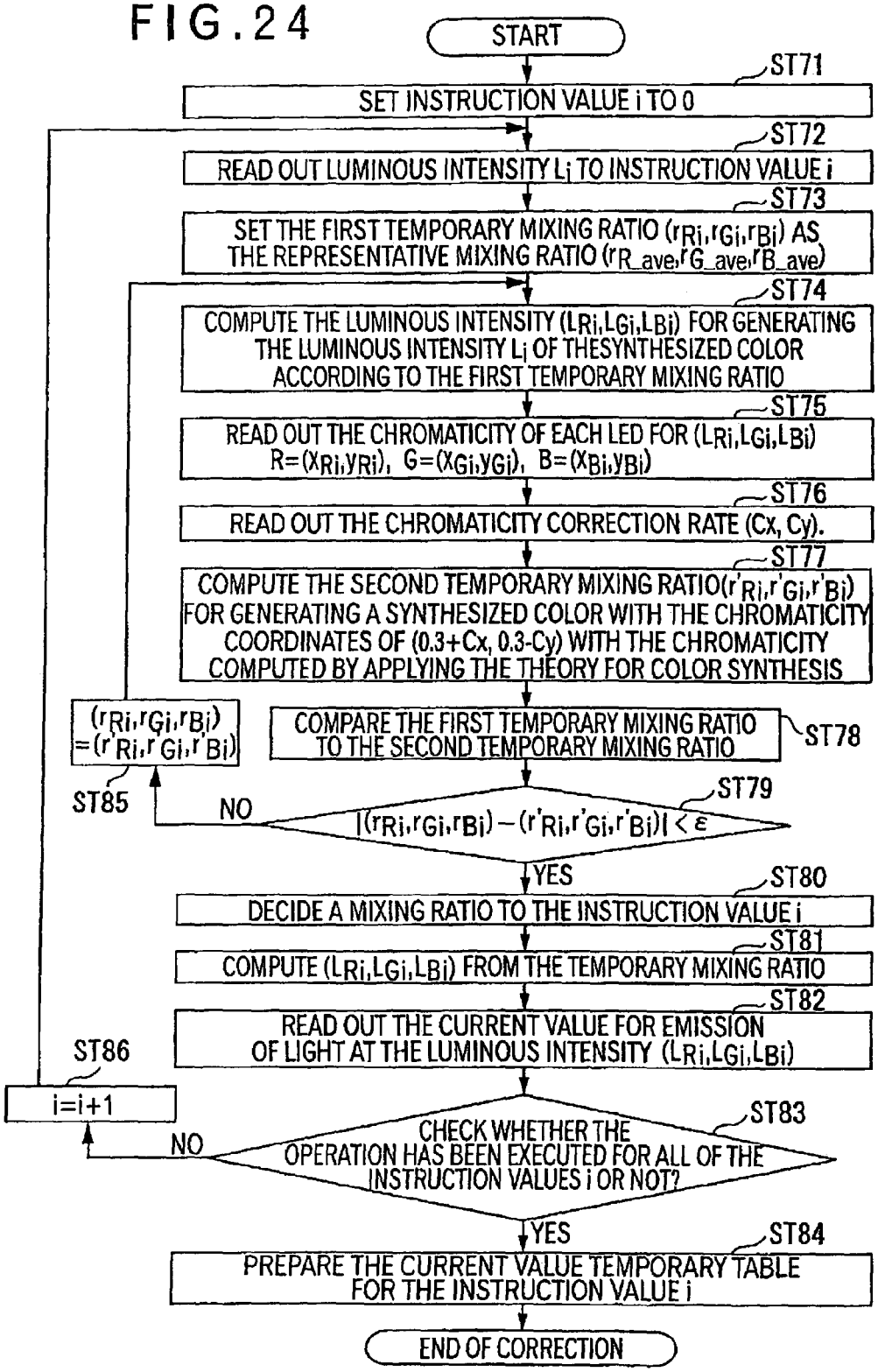
FIG. 24 is a flow chart showing a correcting step in the second embodiment.

A sequence of correction of the instruction value/current value temporary table is shown in the flow chart in FIG. 24. The correcting step ST17 is, as shown in FIG. 24, basically the same as the instruction value/current value temporary table preparing step ST3, and corresponds to the operational flow obtained by combining those shown in FIG. 20 and FIG. 21.

In the correcting step ST7, computing is carried out to obtain the chromaticity coordinates (0.3=$C_x$, 0.3=$C_y$) obtained by adding the chromaticity correction rate ($C_x$, $C_y$) read out just before computing the second temporary mixing ratio through the theory for color synthesis (ST76) as a target chromaticity.

Figure 25A:
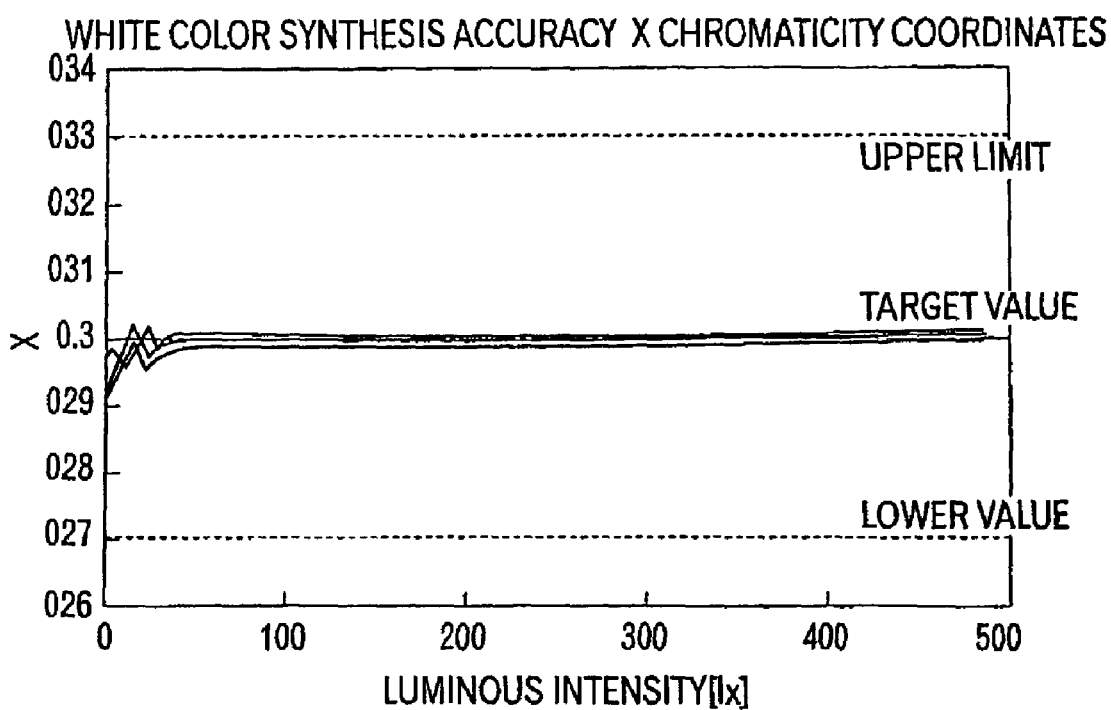
FIGS. 25A and 25B are views showing luminous intensity and chromaticity in synthesized lighting after correction in the second embodiment.
Figure 25B:
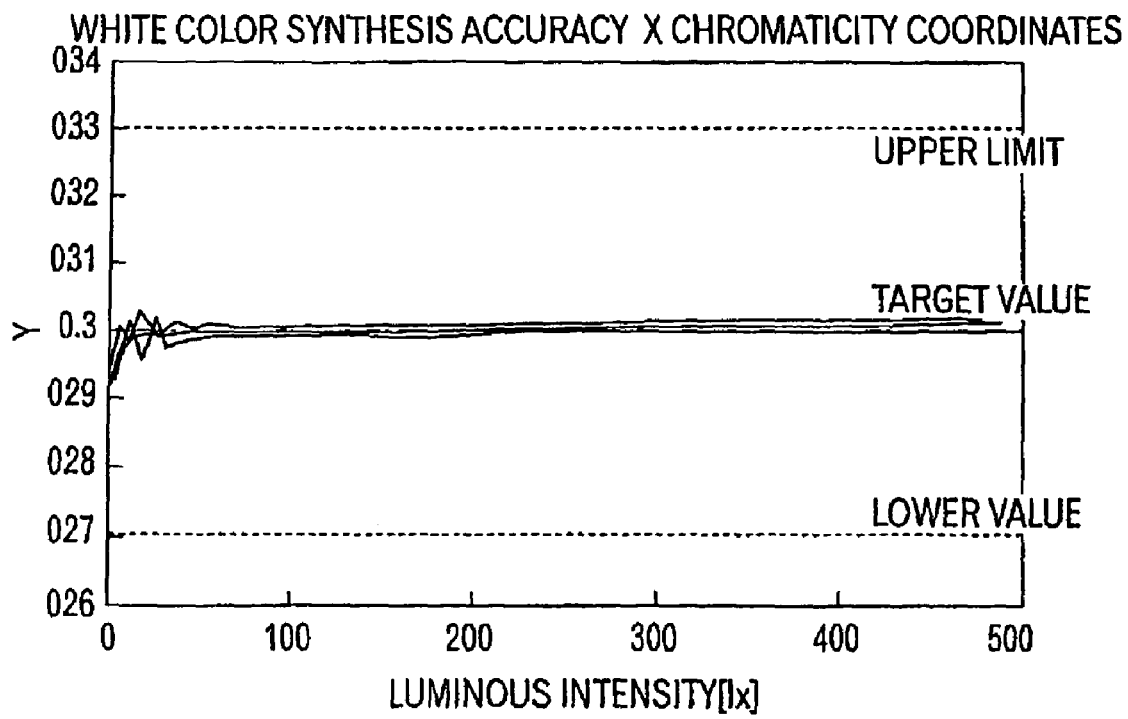
Figure 26A:
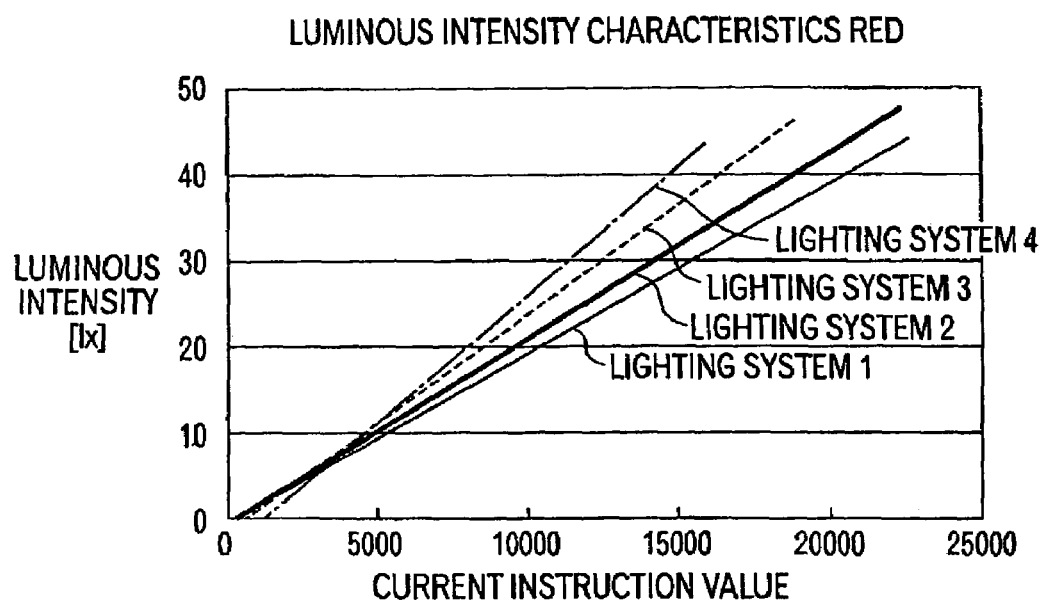
Figure 26B:
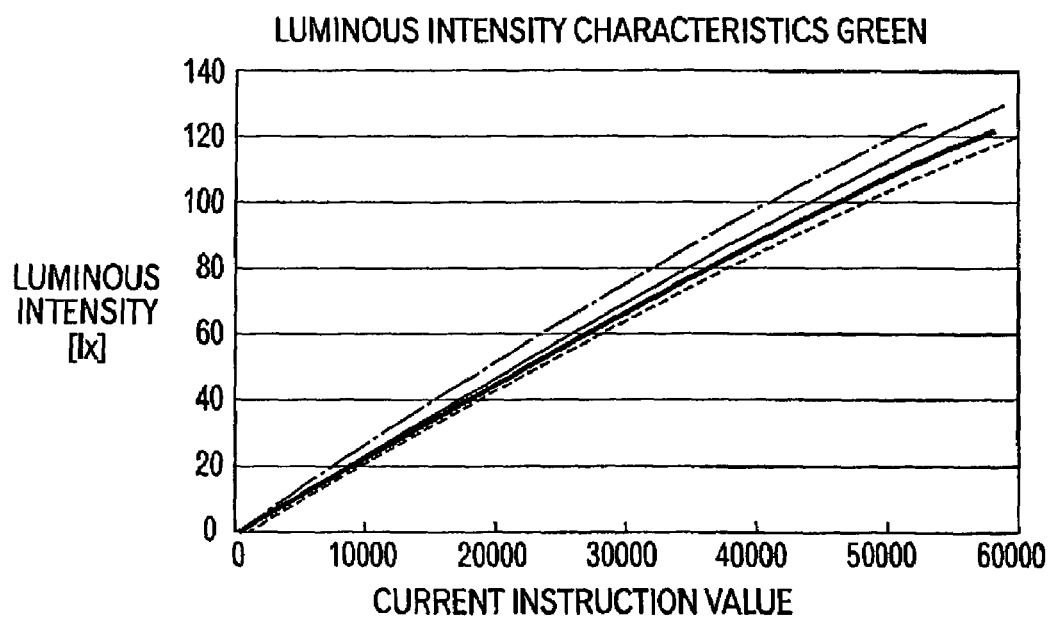
FIG. 26B is a view showing the relation between an impressed current value and luminous intensity in a group of LEDs each emitting light with green for each lighting system based on the conventional technology.
Figure 27:
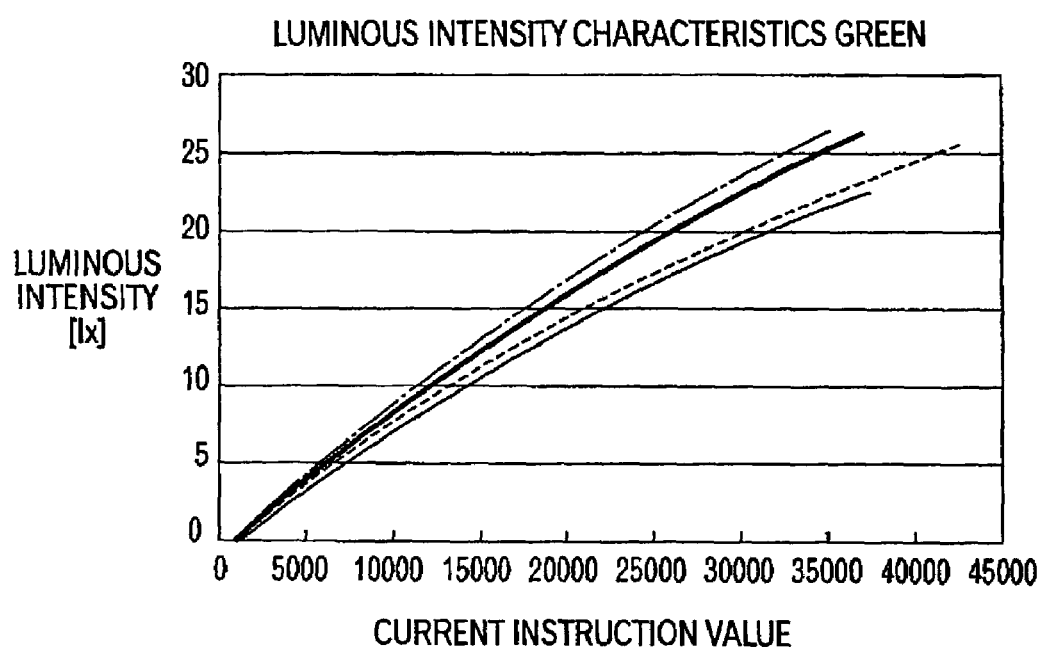
FIG. 27 is a view showing the relation between an impressed current value and luminous intensity in a group of LEDs each emitting light with blue for each lighting system based on the conventional technology.
Figure 28A:
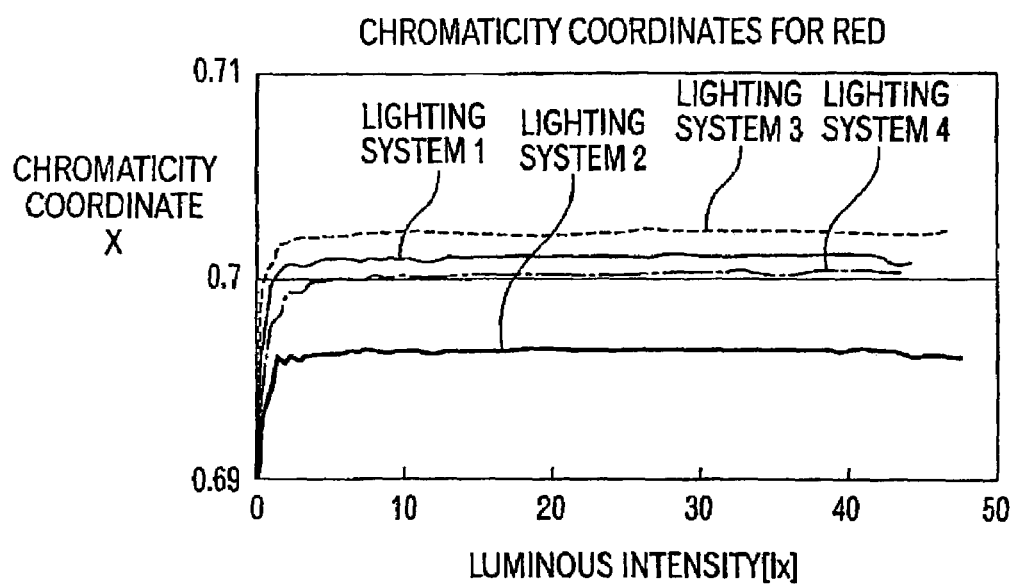
FIG. 28A and FIG. 28B are views showing the relations between luminous intensity and chromaticity in a group of LEDs each emitting light with red for each lighting system based on the conventional technology respectively.
Figure 28B:
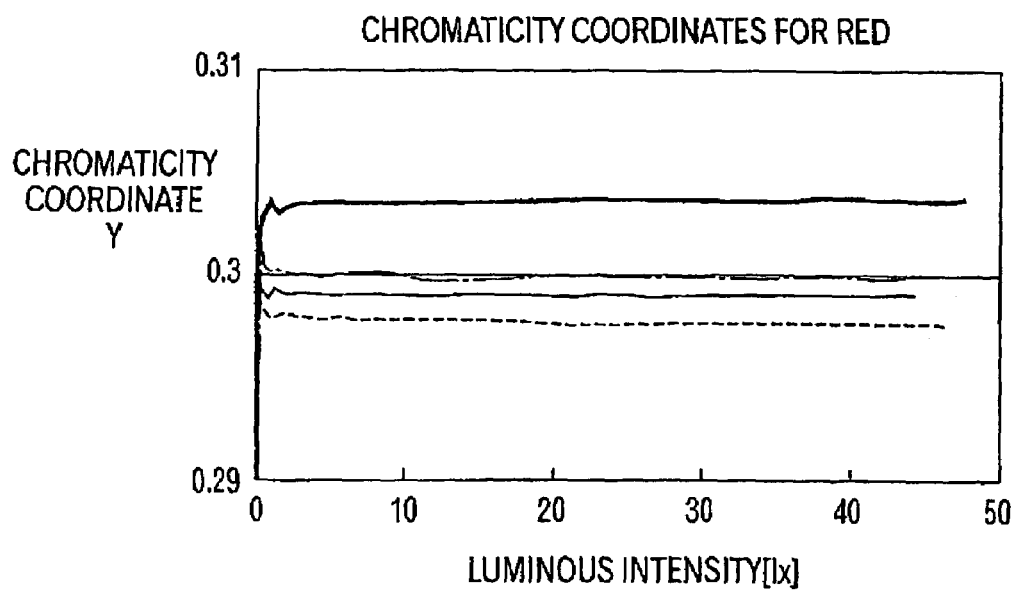
Figure 29A:
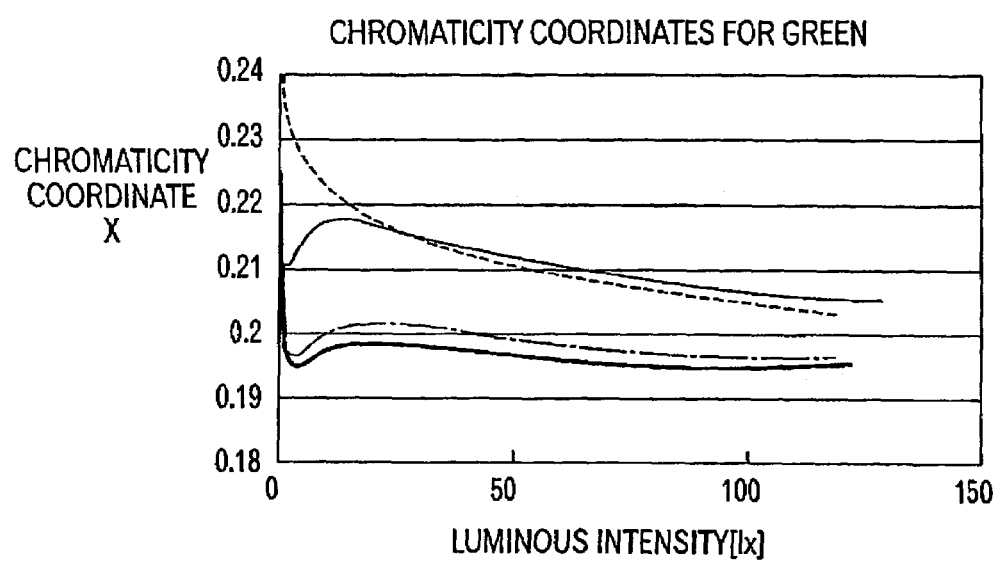
FIG. 29A and FIG. 29B are views showing the relations between luminous intensity and chromaticity in a group of LEDs each emitting light with green for each lighting system based on the conventional technology respectively.
Figure 29B:
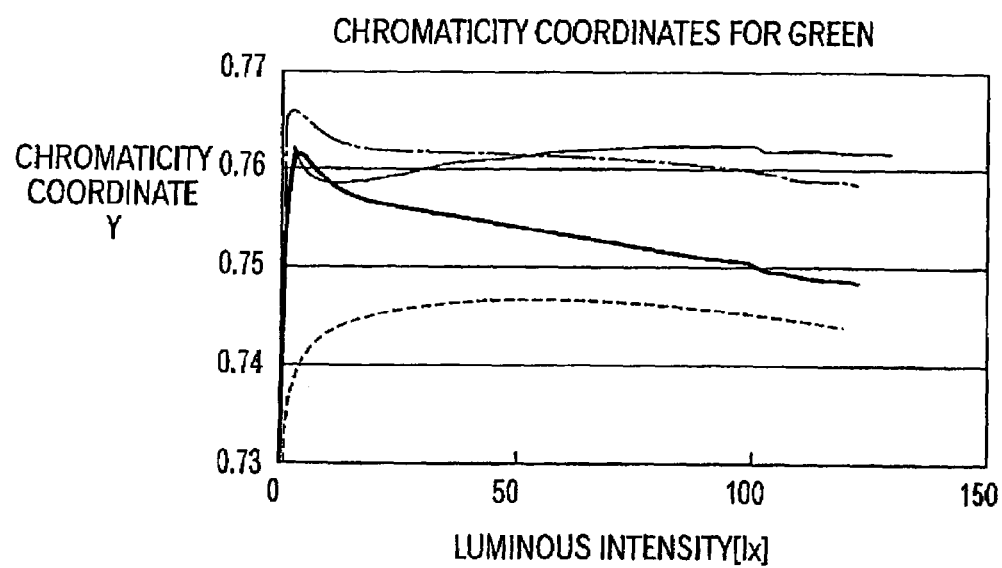
Figure 30A:
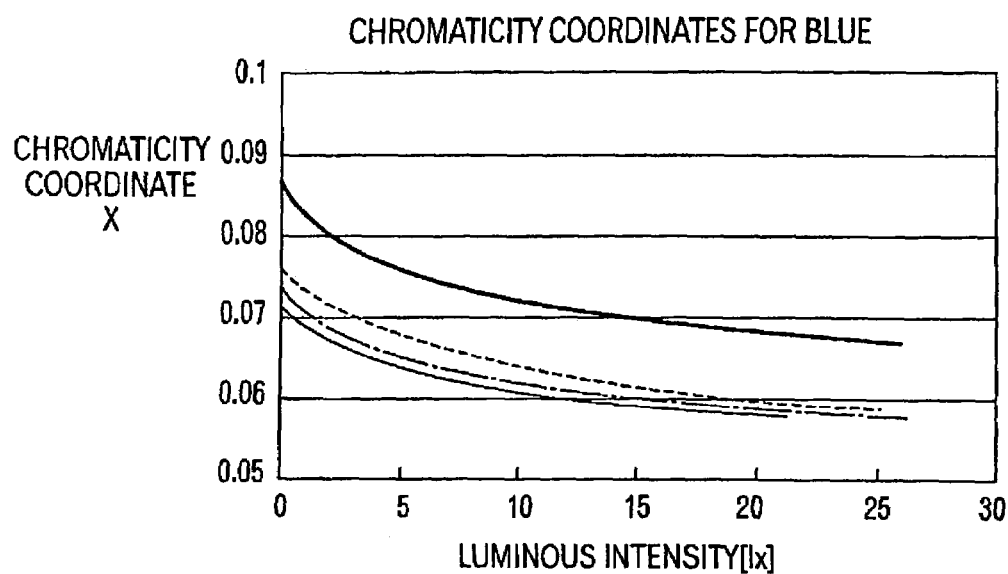
FIG. 30A and FIG. 30B are views showing the relations between luminous intensity and chromaticity in a group of LEDs each emitting light with blue for each lighting system based on the conventional technology respectively.
Figure 30B:
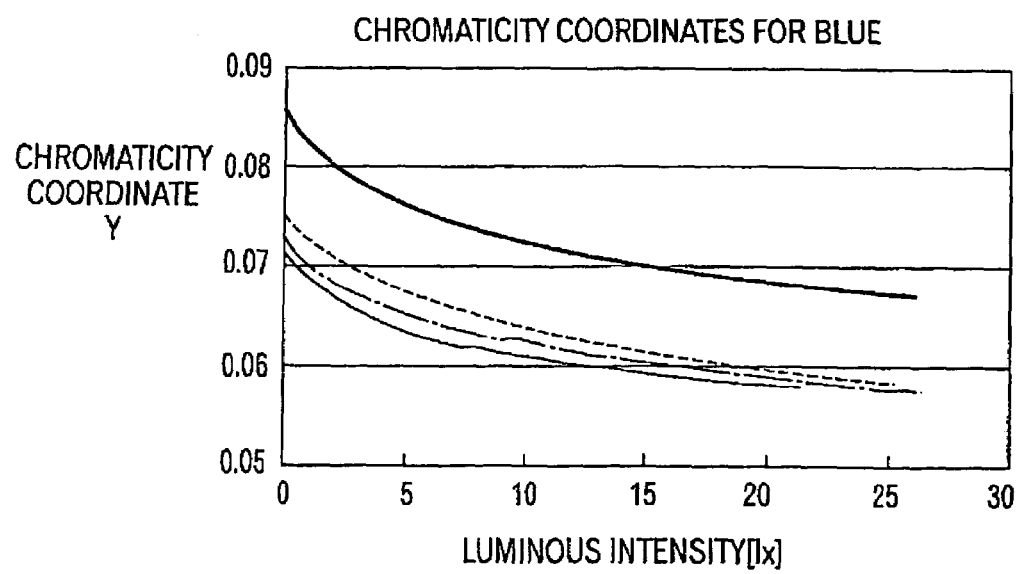

As described above, by previously adding a difference between a value computed based on the theory for color synthesis and the actual chromaticity as a chromaticity correction rate, the chromaticity of the actually produced synthesized color can be set as the target chromaticity (FIG. 25).

The corrected instruction value/current value temporary table is again verified (FIG. 16, ST4), and when a result of verification is acceptable (ST5: YES), it is stored in the regular instruction value/current value table 136 (ST6).

It is to be noted that the chromaticity can be kept constant without carrying out the steps ST4, ST5, and ST7. Namely, the difference dissolved by carrying out the operations in these steps is very small, and therefore the steps ST4, ST5, ST7 may be omitted according to a required accuracy level of a lighting system.

Next, use and operations of the image processing type of measuring device 101 are described below.

When measuring an object to be measured with the image processing type of measuring device 101, at first an object to be measured is placed on the stage 102. Then, an instruction value for instructing luminous intensity of the lighting system 3 is entered with an input unit 134 (input step). Then the CPU 138 reads out an impressed current value to each of the LED groups 391 to 393 in correlation to the entered instruction value from the instruction value/current value table 136, and sends the impressed current values to the driver 137. When a current is impressed from the driver 137 to each of the LED groups 391 to 393, lights are irradiated from the incident-light lighting system 131 and the ring lighting system 132 and synthesized white lighting is irradiated to the measured object at the instructed luminous intensity (light emission step). The reflected light from the measured object is picked up by the image pick-up unit 104, and the form of the measured object is measured by processing the image picked up by the image processing unit 105. A result of computing with the image processing unit 105 is displayed on a display unit such as a CRT, or is outputted from an output device such as a printer.

With the configuration as described above, the following effects are provided.

(1) Characteristics of each of the LED groups 391 to 393 is checked in the fundamental data preparing step ST2, and an impressed current value for generating a synthesized white color at the luminous intensity instructed by an instruction value based on the characteristics is computed. Therefore, even if an LED has the individual difference, white light can be irradiated to an object to be measured at the instructed luminous intensity. As a result, an image of the measured object can accurately be picked up. Further an image can be obtained irrespective of a color or colors of the measured object.

(2) In the mixing ratio computing step ST33, the second temporary mixing ratio for generating a preset chromaticity computed by applying the theory for color synthesis is compared to the first mixing ratio taking into considerations the fact that the chromaticity changes in association with change in luminous intensity, and this comparing operation is repeated until the difference between the first and second mixing ratios is converged into an allowable range. As described above, a mixing ratio for synthesizing lighting with a preset chromaticity can accurately be obtained.

(3) An average chromaticity for each of the LED groups 391 to 393 is computed, and a representative mixing ratio for generating a synthesized color with the preset chromaticity is computed based on this average chromaticity. Then computing in the mixing ratio computing step is executed based on this representative mixing ratio. As a result, it is possible to reduce the times of repetition of computing in the mixing ratio computing step ST33, which in turn makes it possible to compute a mixing ratio quickly.

(4) In the verifying step ST4, the instruction value/current value temporary table obtained by applying the theory for color synthesis is verified. In this step, if the chromaticity of synthesized lighting actually provided is off from the preset chromaticity, the difference is used as the chromaticity correction rate. Then a target value in the theory for color synthesis is displaced by the chromaticity correction value to compute a mixing ratio for correction. With this configuration, synthesized lighting with chromaticity accurately adjusted to the preset value can be provided by correcting the difference between the theoretical value and the actual value.

(5) An impressed current value to an instruction value is prepared in the instruction value/current value table 136, and when an instruction value is entered from the input unit 134, a response to the change in the instruction can quickly be performed only by reading the value from this instruction value/current value table 136.

It should be noted that the present invention is not limited to the second embodiment described above, and it is needless to say that various changes can be made without departing from the gist of the present invention.

The case in which impressed current values are previously computed for all of the instruction values and stored in the instruction value/current value table 136 was described above, but the table is not always required, and the operations for computing a mixing ratio, computing luminous intensity, and reading out an impressed current value or other required operations may sequentially be performed after an instruction value is instructed The case in which the verifying step ST4 is performed after the instruction value/current value table 136 is prepared was described above, but the configuration is allowable in which verification is performed immediately after an impressed current value to an instruction value is obtained, a chromaticity correction rate is computed, and the instruction value/current value table 136 is prepared according to the chromaticity correction value. Further, in a case where chromaticity correction rates for the lighting systems 131, 132 are previously known, the instruction value/current value table 136 may be prepared by reflecting the chromaticity correction rates and applying the theory for color synthesis.

In the above description, the CIE1931 chromaticity coordinates (0.3, 0.3) were employed as preset chromaticity, but it is needless to say that any chromaticity may be set as a target preset value. If average chromaticity is prepared for each of the LED groups 391 to 393, and further if the instruction value/current value table 136 is prepared for lighting at the average chromaticity, synthesized light with various chromaticity can be generated at the instructed luminous intensity.

Further the luminous light source is not limited to an LED, and also LEDs emitting lights with yellow, purple or other colors may be provided in addition to those emitting lights with red, green, and blue colors. It is needless to say that, even if types of colors of lights emitted from the luminous light sources are many, a synthesized color with the present chromaticity can be synthesized at the instructed luminous intensity.

What is claimed is:

1. A lighting system for an image processing type of measuring device having an optical system for lighting including a luminescent light source and irradiating light from this optical system for lighting to an object to be measured to measure such parameters as the size or form of the measured object from an obtained image of the measured object, said lighting system comprising:
    a storage unit with data concerning relations between the luminous intensity obtained with said optical system for lighting and the currents flown to said luminescent light source stored therein; and
    a control unit for controlling a current flown to said luminescent light source based on the data concerning relations between the luminous intensity and the current stored in the storage unit so that the luminous intensity obtained with the optical system for lighting satisfies a preset values,
    wherein the luminescent light source for said optical system for lighting comprises LEDs, and
    said storage unit stores therein data concerning a plurality of relations between the luminous intensity obtained with said optical system for lighting and the impressed currents then flown to said LEDs as references for different luminous intensities.

2. The lighting system for an image processing type of measuring device according to claim 1, wherein said luminescent light source for the optical system for lighting comprises LEDs emitting lights with red, green, and blue color respectively; and
    said storage unit stores therein, for each of the LEDs, data concerning relations between the luminous intensity obtained with said optical system for lighting when the LEDs are lit and the impressed currents flown to the LEDs respectively as references for different luminous intensities.

3. A lighting system for an image processing type of measuring device having an optical system for lighting including a luminescent light source and irradiating light from this optical system for lighting to an object to be measured to measure such parameters as the size or form of the measured object from an obtained image of the measured object, said lighting system comprising:
    a storage unit with data concerning relations between the luminous intensity obtained with said optical system for lighting and the currents flown to said luminescent light source stored therein; and
    a control unit for controlling a current flown to said luminescent light source based on the data concerning relations between the luminous intensity and the current stored in the storage unit so that the luminous intensity obtained with the optical system for lighting satisfies a preset value,
    wherein the luminescent light source for said optical system for lighting comprises LEDs emitting lights with red, green, and blue color respectively; and
    said storage unit stores therein instructions for the currents flown to the LEDs so that the ratio of intensities of lights emitted from the LEDs will be fixed at a constant value for obtaining light with a synthesized color synthesized with red, green, and blue lights for achieving different levels of luminous intensity of the synthesized light and further stores a plurality of data sets concerning the currents flown to the LEDs for achieving different levels of luminous intensity of the synthesized light.

4. The lighting system for an image processing type of measuring device according to claim 3, wherein said storage unit stores therein instructions for the currents flown to the LEDs so that the ratio of intensities of lights emitted from the LEDs will be fixed at a constant value for obtaining synthesized white light synthesized with the red, green and blue lights and also stores therein a plurality of data sets for the currents as references for different luminous intensities of the synthesized white light.

* * * * *